(12) United States Patent
Kimura et al.

(10) Patent No.: US 9,621,004 B2
(45) Date of Patent: Apr. 11, 2017

(54) ARMATURE AND DC MOTOR

(71) Applicant: Mabuchi Motor Co., Ltd., Matsudo (JP)

(72) Inventors: Hiroshi Kimura, Matsudo (JP); Takashi Muramoto, Matsudo (JP); Hisashi Ogino, Matsudo (JP)

(73) Assignee: Mabuchi Motor Co., Ltd., Matsudo, Chiba (JP)

( * ) Notice: Subject to any disclaimer, the term of this patent is extended or adjusted under 35 U.S.C. 154(b) by 0 days.

(21) Appl. No.: 14/537,583

(22) Filed: Nov. 10, 2014

(65) Prior Publication Data

US 2015/0061448 A1 Mar. 5, 2015

Related U.S. Application Data

(63) Continuation of application No. PCT/JP2013/003004, filed on May 10, 2013.

(30) Foreign Application Priority Data

May 11, 2012 (JP) .................................. 2012-109152

(51) Int. Cl.
*H02K 3/28* (2006.01)
*H02K 23/26* (2006.01)
(Continued)

(52) U.S. Cl.
CPC ................. *H02K 3/28* (2013.01); *H02K 3/12* (2013.01); *H02K 5/148* (2013.01); *H02K 5/225* (2013.01);
(Continued)

(58) Field of Classification Search
CPC ................................ H02K 23/00; H02K 23/64
(Continued)

(56) References Cited

U.S. PATENT DOCUMENTS 4,386,291 A * 5/1983 Herr .......................... H02K 3/00
310/207
2006/0220489 A1 10/2006 Osawa et al.
(Continued)

FOREIGN PATENT DOCUMENTS

CN 21315507 Y 6/2008
CN 101807840 A 8/2010
(Continued)

OTHER PUBLICATIONS

Written Opinion for PCT/JP2013/003004, mailed Aug. 13, 2013 (English and Japanese versions).
(Continued)

*Primary Examiner* — Terrance Kenerly
(74) *Attorney, Agent, or Firm* — Schwabe, Williamson & Wyatt, P.C.

(57) ABSTRACT

An armature includes a core having a plurality of teeth, which are radially formed with a rotation axis as the center, a plurality of coils where each coil is wound around each set of teeth containing at least two teeth. The plurality of coils have a plurality of inside coils placed on a rotation axis side of the teeth and a plurality of outside coils placed outside the inside coils. The plurality of inside coils are circularly arranged so that inside coils adjacent to each other are not wound around the same tooth. The plurality of outside coils are circularly arranged so that outside coils adjacent to each other are not wound around the same tooth. The outside coils are wound around a second set of combinations of teeth, which are different from a first set of combinations of teeth around which the inside coils are wound.

3 Claims, 16 Drawing Sheets

(51) Int. Cl.
*H02K 3/12* (2006.01)
*H02K 5/14* (2006.01)
*H02K 5/22* (2006.01)
*H02K 13/00* (2006.01)
*H02K 7/04* (2006.01)

(52) U.S. Cl.
CPC .......... *H02K 13/006* (2013.01); *H02K 23/26* (2013.01); *H02K 7/04* (2013.01)

(58) Field of Classification Search
USPC ....................................................... 310/177
See application file for complete search history.

(56) References Cited

U.S. PATENT DOCUMENTS

| | | | | |
|---|---|---|---|---|
| 2007/0024148 | A1* | 2/2007 | Maita | H02K 23/405 310/216.011 |
| 2011/0050025 | A1 | 3/2011 | Doushita et al. | |
| 2011/0095638 | A1* | 4/2011 | Sakata | H02K 23/20 310/179 |
| 2011/0198521 | A1* | 8/2011 | Hayashi | F02D 41/005 251/129.13 |
| 2011/0241472 | A1* | 10/2011 | Tanaka | H02K 3/28 310/208 |

FOREIGN PATENT DOCUMENTS

| | | |
|---|---|---|
| JP | 10-285854 A | 10/1998 |
| JP | 2005-117702 A | 4/2005 |
| JP | 2011-055655 A | 3/2011 |
| JP | 4987628 B2 | 2/2012 |
| WO | 2005/036724 A1 | 4/2005 |

OTHER PUBLICATIONS

International Preliminary Report on Patentability for PCT/JP2013/003004, mailed Nov. 11, 2014 (English and Japanese versions).
International Search Report for PCT/JP2013/003004, mailed Aug. 13, 2013 (English and Japanese versions).
Chinese Patent Application No. 2013800247614 Office Action dated May 30, 2016, 26 pages with English translation.
European Patent Application No. 13786922.8 Extended European Search Report dated May 27, 2016, 9 pages.
Japanese Patent Application No. 2013-545572 Office Action dated Dec. 1, 2016, 4 pages with English translation.

* cited by examiner

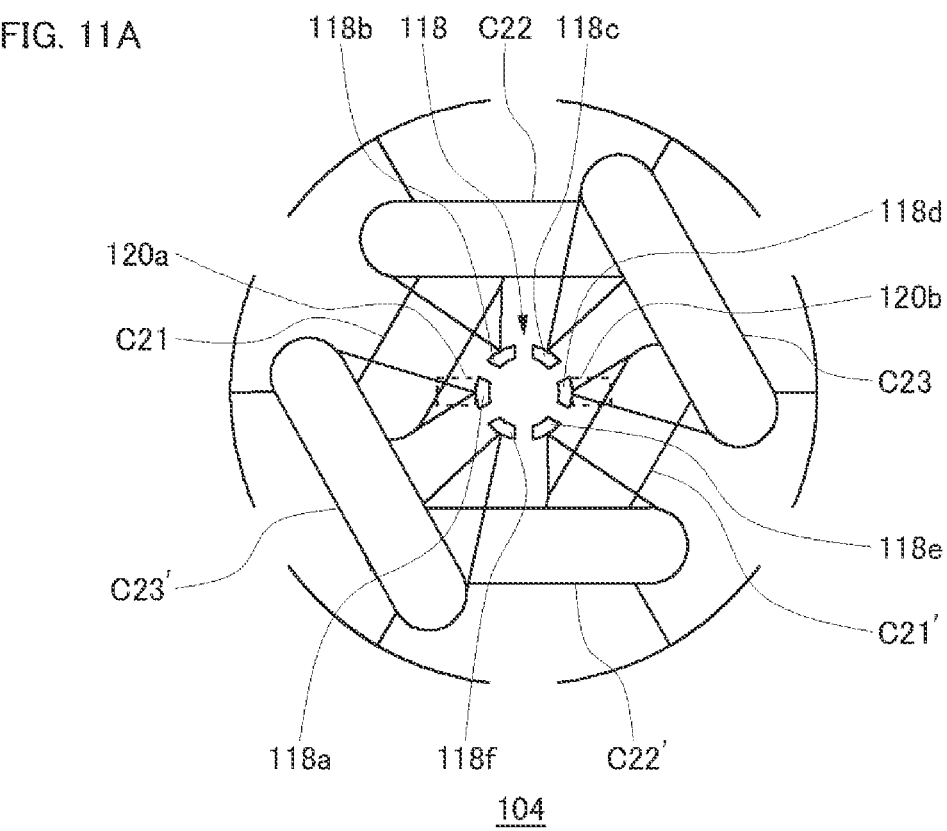
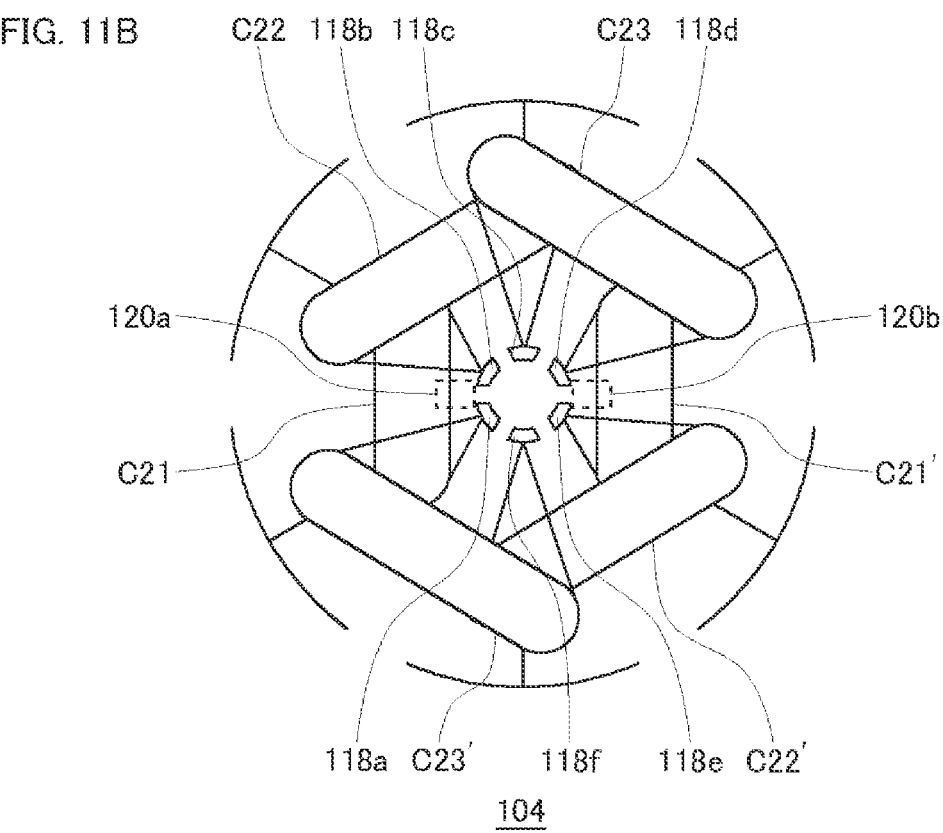

ARMATURE AND DC MOTOR

CROSS-REFERENCE TO RELATED APPLICATIONS

This application is based upon and claims the benefit of priority from the prior Japanese Patent Application No. 2012-109152, filed on May 11, 2012, and International Patent Application No. PCT/JP 2013/003004, filed on May 10, 2013, the entire content of each of which is incorporated herein by reference.

BACKGROUND OF THE INVENTION

1. Field of the Invention

The present invention relates to an armature and a motor.

2. Description of the Related Art

Conventionally, motors are used in various applications including automobiles and office machines. A motor is provided with an armature where a plurality of coils are wound, and copper wires need to be wound along the grooves of a core of each armature when the motor is to be manufactured.

Proposed are various types of methods and apparatuses for winding the copper wire around the core. For example, proposed is a rotor for a direct-current (DC) motor where a multiplicity of armature coils having predetermined turns (N) are sequentially wound between an arbitrary slot of a plurality of slots and another arbitrary slot striding across a slot adjacent to said arbitrary slot. Here, the plurality of slots are formed between magnetic pole portions of an armature core. This armature core is comprised of (1) a rotor-axis peripheral portion, having a through-hole, to which a rotor axis is firmly fixed in a center, (2) a protrusion protruding radially from the rotor-axis peripheral portion, and (3) a multiplicity of the approximately T-shaped magnetic pole portions each formed by an end portion extending toward a peripheral direction from a tip of the protrusion (see Patent Document 1).

RELATED ART DOCUMENT

[Patent Document 1] Japanese Unexamined Patent Application Publication (Kokai) No. Hei10-285854.

In the above-described motor rotor, however, an armature coil wound later interferes with an armature coil, which has already been wound inside said armature coil. Thus, the winding of the armature coil wound later and the winding of the previously-wound armature appear in different forms and styles from each other. As a result, a plurality of coils are not uniformly arranged. This may possibly have an adverse effect on the torque characteristics and vibration of the motor.

SUMMARY OF THE INVENTION

The present invention has been made in view of the foregoing circumstances, and a purpose thereof is to provide a technology capable of further improving the characteristics of a motor.

In order to resolve the foregoing problems, an armature according to one embodiment of the present invention includes: a core having a plurality of teeth, which are radially formed with a rotation axis as a center; and a plurality of coils where each coil is wound around each set of teeth containing at least two teeth. The plurality of coils have: a plurality of inside coils placed on a rotation axis side of the teeth; and a plurality of outside coils placed outside the inside coils. The plurality of inside coils are circularly arranged so that inside coils adjacent to each other are not wound around the same tooth; the plurality of outside coils are circularly arranged so that outside coils adjacent to each other are not wound around the same tooth; and the outside coils are wound around combinations of teeth different from combinations of teeth around which the inside coils are wound.

Another embodiment of the present invention relates also to an armature. The armature includes: the core having m teeth (m being an integer greater than or equal to "6"), which are radially formed with the rotation axis as the center; and a plurality of coils, where each coil is wound around each set of n teeth (n being an integer such that m/n is greater than or equal to "3"). The plurality of coils has: m/n inside coils placed on a rotation axis side of the teeth; and m/n outside coils placed outside the inside coils. The m/n inside coils are arranged such that the m/n inside coils form a polygon, having m/n sides, as viewed from a direction of axis line of the rotation axis; the m/n outside coils are arranged such that the m/n outside coils form a polygon, having m/n sides, as viewed from the direction of axis line of the rotation axis; and the outside coils are arranged such that the phase of the outside coils is shifted by degrees, which are [360 degrees divided by m], relative to adjacent inside coils with the rotation axis as the center. Coils may be further provided outside the aforementioned outside coils. In this case, assume that the inside coils are defined to belong to a first layer and that the outside coils, adjacent to this first layer, which are provided outside those of the first layer are defined to belong to a second layer. Assume similarly that the outside coils adjacent to this second layer, which are provided outside those of the second layer are defined to belong to a third layer and that the outside coils adjacent to this third layer, which are provided outside those of the third layer are defined to belong to a fourth layer. Then the number of layers formed can be expressed by m/(m/n).

Still another embodiment of the present invention relates to a direct-current (DC) motor. The DC motor includes: a cylindrical housing; a stator having at least a pair of magnetic poles, the stator provided along an inner surface of the housing; an armature placed counter to the stator; and a pair of or a plurality of pairs of brushes that slides an outer peripheral surface of the commutator.

Optional combinations of the aforementioned constituting elements, and implementations of the invention in the form of methods, apparatuses, systems, and so forth may also be practiced as additional modes of the present invention.

BRIEF DESCRIPTION OF THE DRAWINGS

Embodiments will now be described by way of examples only, with reference to the accompanying drawings which are meant to be exemplary, not limiting and wherein like elements are numbered alike in several Figures in which:

FIG. 11A is a diagram schematically showing a state where a brush is in contact with a commutator of an armature shown in FIG. 7;

FIG. 11B is a diagram schematically showing a state where the armature of FIG. 11A is rotated by 30 degrees;

DETAILED DESCRIPTION OF THE INVENTION

Figure 1:
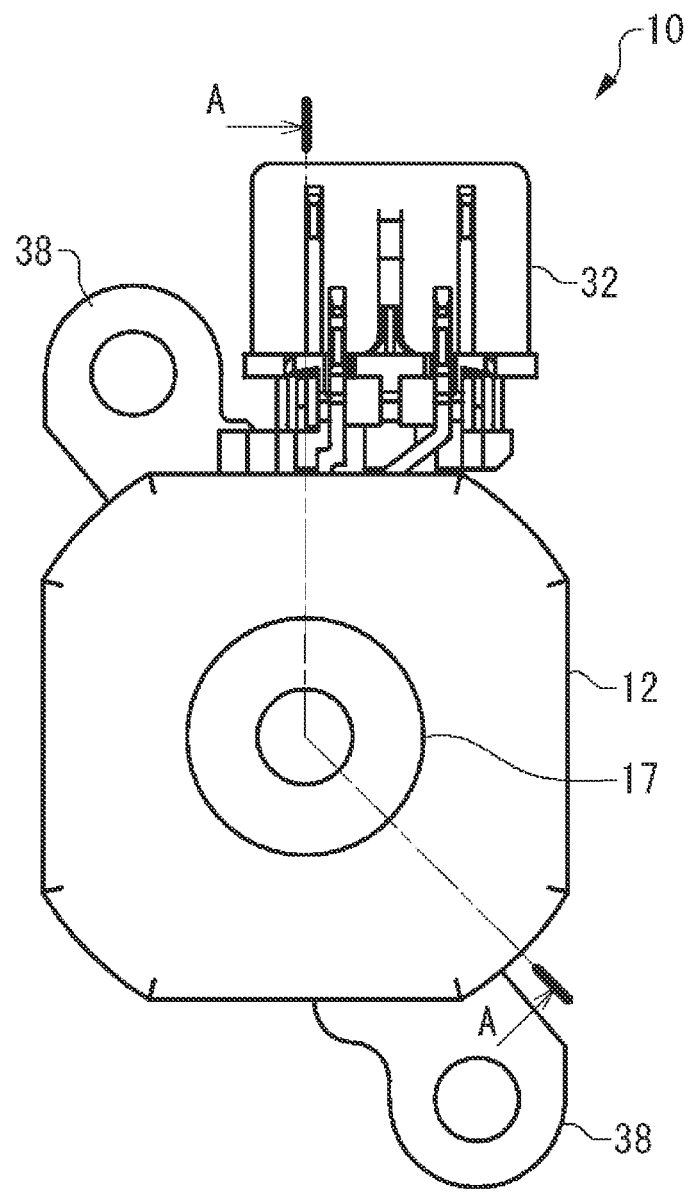
FIG. 1 is a front view of a DC motor according to an embodiment.

The invention will now be described by reference to the preferred embodiments. This does not intend to limit the scope of the present invention, but to exemplify the invention.

An armature includes a core having a plurality of teeth, which are radially formed with a rotation axis as a center, and a plurality of coils where each coil is wound around each set of teeth containing at least two teeth. The plurality of coils have: a plurality of inside coils placed on a rotation axis side of the teeth; and a plurality of outside coils placed outside the inside coils. The plurality of inside coils are circularly arranged so that inside coils adjacent to each other are not wound around the same tooth; the plurality of outside coils are circularly arranged so that outside coils adjacent to each other are not wound around the same tooth; and the outside coils are wound around combinations of teeth different from combinations of teeth around which the inside coils are wound.

By employing this embodiment, the plurality of inside coils placed on the rotation axis side of the teeth are circularly arranged so that inside coils adjacent to each other are not wound around the same tooth. In other words, the plurality of inside coils are wound around predetermined teeth without much interfering with each other. Thus the leaning to one side (namely, non-uniform arrangement) thereof that may result from the interference otherwise occurring among the coils can be minimized and a highly symmetric (well-balanced) arrangement of the inside coils can be achieved. Similarly, the plurality of outside coils are circularly arranged so that outside coils adjacent to each other are not wound around the same tooth. In other words, the plurality of outside coils are wound around predetermined teeth without much interfering with each other. Thus the non-uniform arrangement thereof that may result from the interference otherwise occurring among the coils can be minimized and a highly symmetric (well-balanced) arrangement of the outside coils can be achieved. Also, since the outside coils are wound around combinations of teeth different from the combinations of teeth around which the inside coils are wound, rotational characteristics having smoother torque fluctuations are achieved.

Here, each of the teeth may be of a shape such that a coil can be wound around each tooth. For example, the tooth may be of a shape such that the cross sectional shape perpendicular to the rotation axis is an arm (I)-like one extending in a radial direction of the core. Or the tooth may be of a T-shape where the tip thereof is branched out on or projected from the both sides in the circumferential direction. Also, the "different combinations of teeth", around which the outside coils are wound, includes not only a case where the teeth in the set of combinations for the outside coils differ from all the teeth in the set of combinations of teeth around which the inside coils are wound but also a case where the teeth in the set of combinations for the outside coils partially differ therefrom. Also, the shape meant in the expression "circularly arranged" may include not only a circular shape but also a polygonal shape such as a triangular, a quadrangular (square) or pentagonal shape.

Another embodiment of the present invention relates also to an armature. The armature includes: the core having m teeth (m being an integer greater than or equal to "6"), which are radially formed with the rotation axis as the center; and a plurality of coils, where each coil is wound around each set of n teeth (n being an integer such that m/n is greater than or equal to "3"). The plurality of coils has: m/n inside coils placed on a rotation axis side of the teeth; and m/n outside coils placed outside the inside coils. The m/n inside coils are arranged such that the m/n inside coils form a polygon, having m/n sides, as viewed from a direction of axis line of the rotation axis; the m/n outside coils are arranged such that the m/n outside coils form a polygon, having m/n sides, as viewed from the direction of axis line of the rotation axis; and the outside coils are arranged such that the phase of the outside coils is shifted by degrees, which are [360 degrees divided by m], relative to adjacent inside coils with the rotation axis as the center. Coils may be further provided outside the aforementioned outside coils. In this case, assume that the inside coils are defined to belong to a first layer and that the outside coils, adjacent to this first layer, which are provided outside those of the first layer are defined to belong to a second layer. Assume similarly that the outside coils adjacent to this second layer, which are provided outside those of the second layer are defined to belong to a third layer and that the outside coils adjacent to this third layer, which are provided outside those of the third layer are defined to belong to a fourth layer. Then the number of layers formed can be expressed by m/(m/n).

By employing this embodiment, m/n inside coils are so arranged as to form a (m/n)-gon, as viewed from the direction of axis line of the rotation axis, and m/n outside coils are so arranged as to form a (m/n)-gon, as viewed from the direction of axis line of the rotation axis. And these inside coils and these outside coils are arranged such that the inside coils and the outside coils form mutually similar shapes. Also, the outside coils are arranged such that the phase of the outside coils is shifted by degrees, which equal to [360°/m], relative to their adjacent inside coils with the rotation axis as the center. As a result, each coil is arranged at uniform angular intervals, thereby achieving the rotational characteristics having smooth torque fluctuations.

In a plurality of slits, of the slits formed between adjacent teeth, where no inside coils is inserted, the shapes of spaces formed on a rotation axis side apart from the outside coils may be practically identical to each other. Thereby, a well-balanced rotation is kept while the armature is rotating and therefore the vibration occurring when such the armature is used for the motor is suppressed.

If there are S such spaces, a plurality of coils may be provided such that they are S-fold symmetry about the rotation axis. As a result, a well-balanced rotation is kept while the armature is rotating and therefore the vibration occurring when such the armature is used for the motor is suppressed.

The armature may further include: a shaft that penetrates a center of the core; and a commutator, fixed to the shaft, which rotates with the armature. The commutator may have segments the number of which is equal to the number of teeth. Or alternatively, the commutator may be divided into segments the number of which is equal to or less than the number of inside coils or outside coils. As a result, the number of segments for the commutator is less than a half of or exactly a half of the total number of coils. This means that the size of each segment can be made larger. Hence, the manufacture of the commutators can be made easier and the workability in assembling them can be improved as well.

Each of the segments may have a first stopper, by which at least an end of the inside coil is stopped, and a second stopper, by which at least an end of the outside coil is stopped. Thereby, even though the ends of a plurality of coils need to be stopped by each segment, the ends thereof do not need to be stopped by the same stopper. This allows the size of stopper to be smaller. Also, the manufacturing is easier than when the end of the next coil is stopped while the end of the other coil is stopped.

The plurality of coils may be connected in a unicursal manner. As a result, the armatures can be manufactured by a lower-cost apparatus without using an apparatus called a double flyer capable of simultaneously forming two coils.

Still another embodiment relates to a direct-current (DC) motor. The DC motor includes: a cylindrical housing; a stator having at least a pair of magnetic poles, the stator provided along an inner surface of the housing; an armature placed counter to the stator; and a pair of or a plurality of pairs of brushes that slides an outer peripheral surface of the commutator. Thereby, a DC motor whose characteristics have been improved over the conventional one can be realized.

Still another embodiment relates to an armature. The armature includes: a core having m teeth (m being an even number) radially formed with a rotation axis as a center; m/2 segments; and a plurality of coils where each coil is wound around each set of teeth containing at least two teeth. The plurality of coils are such that the plurality of coils have a pair of coils and are so arranged as to be line-symmetrical with respect to a line passing through centers of the pair of coils, and are also such that two coils are connected in parallel with each other in between a pair of segments.

By employing this embodiment, a plurality of coils are so arranged as to be line-symmetrical with respect to the line and therefore the stability of the armature during rotation is enhanced.

The two coils, which are connected in parallel with each other in between the pair of segments, are preferably positioned 180 degrees in opposite of each other with a line, which is perpendicular to the rotation axis, located between the two coils. Also, the number of teeth is six, for instance. Also, the number of coils is six, for instance.

Hereinbelow, the embodiments of the present invention will be described in detail with reference to the accompanying drawings. Note that the identical components are given the identical reference numerals in the description of all accompanying figures and that the repeated description thereof will be omitted as appropriate.

(DC Motor)

Figure 2:
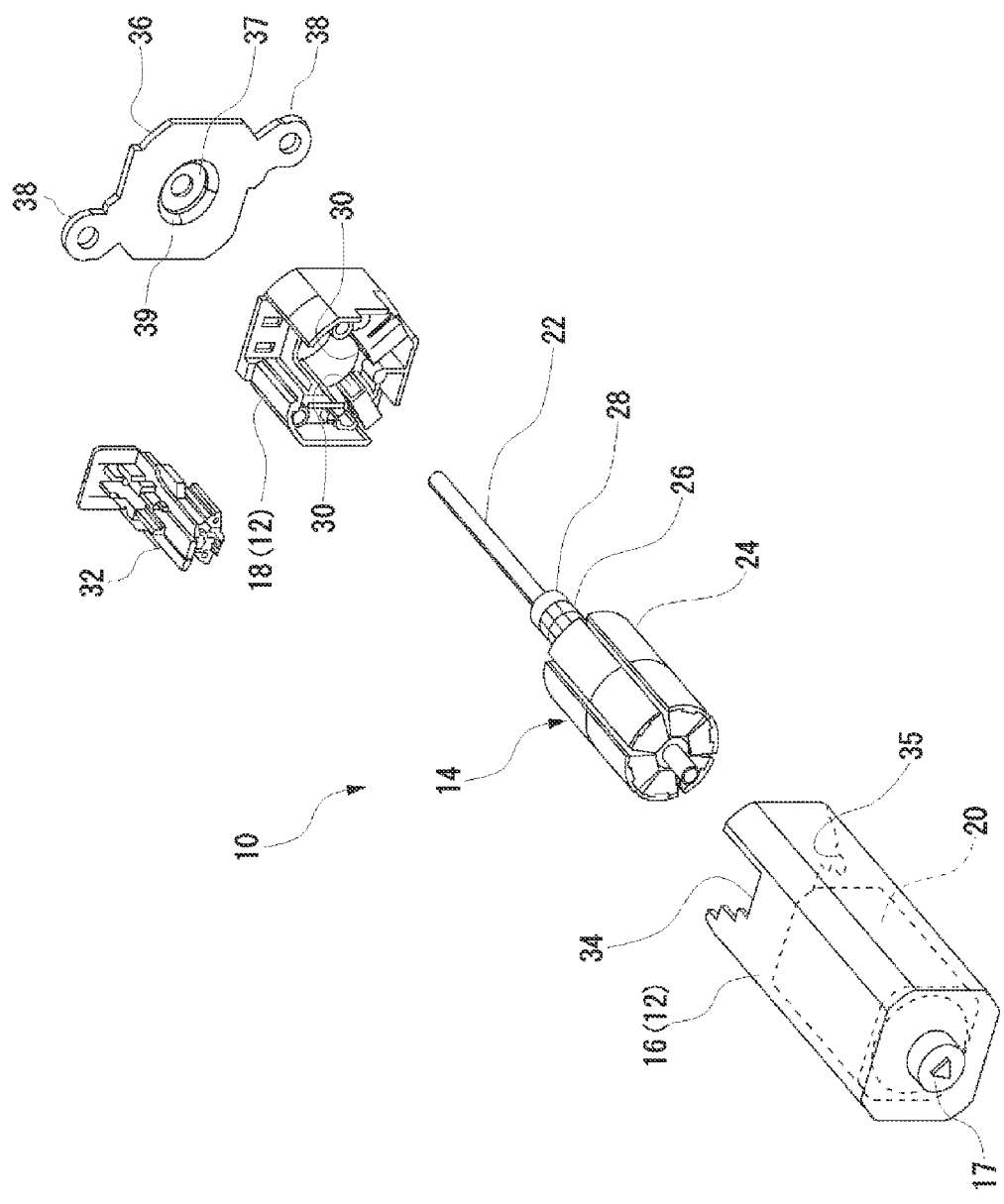
FIG. 2 is an exploded perspective view of a DC motor.
Figure 3:
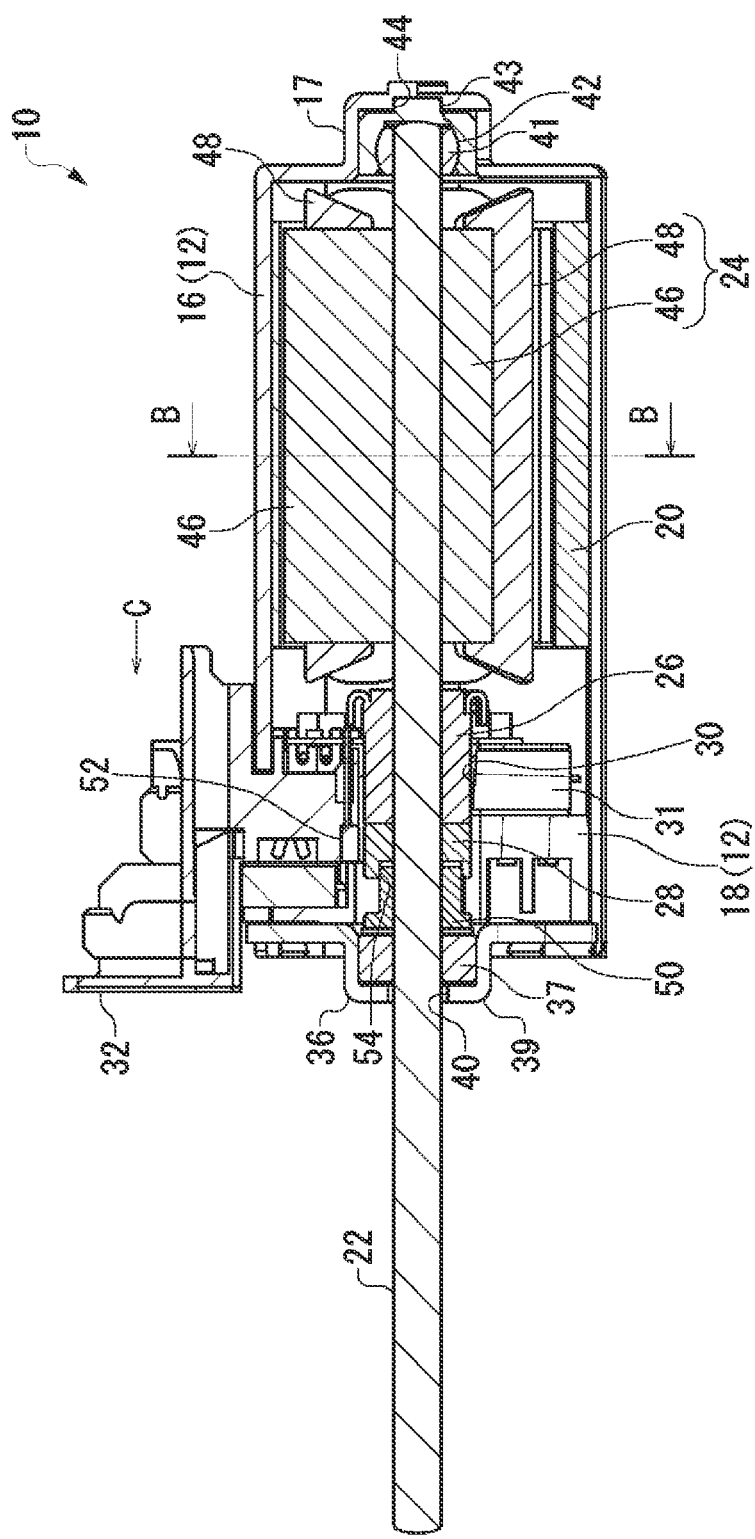
FIG. 3 is a cross-sectional view taken along the line A-A and viewed on the side shown by the arrows of FIG. 1.

A description is first given of a general structure of a direct-current (DC) motor (hereinafter referred to as "motor" as appropriate). FIG. 1 is a front view of a DC motor according to an embodiment. FIG. 2 is an exploded perspective view of the DC motor. FIG. 3 is a cross-sectional view taken along the arrows A-A of FIG. 1. Note that the structure shown in each of FIG. 1 to FIG. 3 are merely exemplary, and the structure of an armature according to the present embodiment is not limited those as shown in FIG. 1 to FIG. 3.

As shown in FIG. 1 and FIG. 2, a motor 10 is so configured that a rotor 14 is housed in a cylindrical housing 12. The housing 12 is an assembly of a bottomed cylindrical metal case 16 and a cylindrical brush holder 18 made of resin. The metal case 16 also functions as a yoke that forms a magnetic circuit. The metal case 16 has a cylindrical field magnet (hereinafter referred to simply as "magnet") 20 fixed to the inner peripheral surface thereof and, together with it, forms a stator. The magnet 20 according to the present embodiment has two poles but the number of poles and the locations of the poles are not limited thereto. A boss 17 is so formed in the center of the bottom of the metal case 16 as to slightly protrude outward, and the boss 17 houses a bearing to be discussed later.

A rotor 14, which is disposed on an end half of a rotary shaft 22, is comprised of an armature 24, a commutator 26, a detecting magnet 28, and the like. Disposed in the brush holder 18 is a pair of carbon brushes 30 placed opposite to the commutator 26. A connector 32 for electrical connection to not-shown electrical components is detachably mounted to the brush holder 18.

The brush holder 18 is assembled such that the brush holder 18 is inserted into the metal case 16 while the connector 32 is attached to a brush holder assembling body. Cut-out portions 34 and 35 are formed on side faces of the metal case 16 near an opening end thereof. When the brush holder assembly body is assembled, the connector 32 and the brush holder 18 are stopped, at their predetermined positions, by bottom base ends of the cut-out portions 34 and 35, respectively, thereby enabling the connector 32 and the brush holder 18 to be appropriately positioned.

After the brush holder assembly body has been assembled as described above, an opening of the metal case 16 is sealed by an end plate 36. The end plate 36 has nearly the same shape as that of the opening of the metal case 16 and is inserted and fitted to the opening thereof. The end plate 36 is secured to the metal case 16 such that the opening end of the end plate 36 is swaged inward after the end plate 36 has been inserted into the metal case 16. A pair of flanges 38 extending outward at mutually opposite directions (sides) are provided on the periphery of the end plate 36, so that each flange 38 forms a mounting portion for an electrical component.

A boss 39 is formed in a center of the end plate 36 in such a manner as to slightly protrude outward, and a ring-shaped sliding bearing 37, which is formed of so-called oilless metal where a lubricating oil has been impregnated, is press-fitted in the boss 39. A through-hole is formed, on a bottom of the boss 39, coaxially with the sliding bearing 37. The other end half of the shaft 22 penetrates this through-hole and is exposed to the outside and is connected to an apparatus to be driven by way of not-shown gears. Note that the sliding bearing 37 can be provided in the brush holder 18 instead of in the end plate 36. A structure, according to the present embodiment, where the sliding bearing 37 is kept in the end plate 36 formed of a metal, is robust against the change in temperature and humidity as compared with the brush holder 18 formed of resin and also produces less expansion and contraction of volume due to the change in temperature and humidity environments while the motor is running. Hence, the coaxiality of the shaft 22 can be improved and therefore the rotating state of the rotor 14 can be kept accurately and stably.

As shown in FIG. 3, an internal space of the housing 12 is so formed as to be enclosed by the metal case 16, the brush holder 18 and the connector 32. The aforementioned sliding bearing 37 is press-fitted in the boss 39 of the end plate 36, and thereby pivotally and rotatably supports a part near a through-hole 40 of the shaft 22. On the other hand, a bottomed cylindrical bearing holder 42 is placed in the boss 17 of the metal case 16. In this bottomed cylindrical bearing holder 42, a spherical sliding bearing 41, which is a sliding bearing and whose outer shape is spherical, is coaxially inserted inside the boss 17 and fitted therein. The spherical sliding bearing 41 is press-fitted to an end part of the shaft 22. A raised part 43, which is a triangle in cross section, is provided in the center of the bottom of the bearing holder 42. The raised part 43 is fitted to a recess 44, having the same shape as that of the raised part 43, which is provided in the bottom of the boss 17. As a result, the turning/rotation thereof about an axis line is prevented. In other words, the raised part 43 and the recess 44 realize a rotation stopper structure of the bearing holder 42. Also, the spherical sliding bearing 41 is turnable/rotatable relative to the bearing holder 42 at a curved surface of the outer circumference thereof. In other words, the structure is provided that allows the axis line of the sliding bearing 41 coaxial with the shaft 22 and the axis line of the bearing holder 42 to form a slope of a predetermined angle therebetween and therefore the self-aligning is achieved by the rotation of the shaft 22.

The armature 24 is configured by including a core 46, which is press-fitted on the shaft 22, and windings 48, which are wound around the core 46. The core 46 is placed opposite to the magnet 20 with a predetermined clearance (magnetic gap) between the outer periphery of the core 46 and the inner periphery of the magnet 20. The details of the magnetic pole configuration by the magnet 20 and the core 46 will be discussed later.

The commutator 26, the detecting magnet 28 and the bush 50 are placed side by side, in between the armature 24 and the sliding bearing 37 along the shaft 22, in the order of being closer to the armature 24. The commutator 26, which is cylindrical in shape, is press-fitted on the shaft 22 in such a position that it is placed opposite to the carbon brushes 30 with the connector 32 assembled to the metal case 16. The brush holder 18 has cylindrical carbon holders 31 fixed thereto, and the carbon brushes 30 are inserted into and supported by the carbon holders 31.

The detecting magnet 28, which is a cylinder in shape and is slightly smaller in outside diameter than the commutator 26, is inserted around the shaft 22 in such a manner as to abut on the commutator 26 in the direction of axis line. A Hall element 52 is provided on the underside of the connector 32, and the Hall element 52, when the connector 32 is assembled to the metal case 16, is placed opposite to the detecting magnet 28. As described above, the detecting magnet 28 is so constructed as to be a little smaller than the commutator 26. This prevents the detecting magnet 28 from interfering with the carbon brushes 30 when the shaft 22 is inserted to the brush holder 18 from the other end of the shaft 22. Also, the detecting magnet 28 is made large within a range smaller than that in the commutator 26, so that the detecting magnet 28 can be placed near the Hall element 52.

The detecting magnet 28 is magnetized in two poles such that as it rotates, the north pole and the south pole appear alternately on the outer periphery thereof. The Hall element 52 detects the switching (boundary) of the magnetic poles along with the rotation of the detecting magnet 28 and then outputs a pulse signal therefor. The rotational speed (number of revolutions) of the motor 10 can be detected by obtaining the number of pulse signals in a predetermined period of time. In the present embodiment, the detecting magnet 28 is magnetized in two poles but may be magnetized in four poles or other even-number poles, instead.

A recess 54 of a quadrangular or square shape in cross section is provided in the surface of the detecting magnet 28 opposite to the bush 50. On the other hand, the bush 50 is of stepped column-like shape such that the outer shape thereof is complementary to the shape of the recess 54. The bush 50 is press-fitted on the shaft 22 such that the tip of the bush 50 is fitted to the recess 54. As a result, the rotation of the detecting magnet 28 relative to the shaft 22 is prevented. The bush 50, which is made of a magnetic material such as iron, also functions as a back yoke that stabilizes the magnetic force of the detecting magnet 28.

(Armature)

Figure 4:
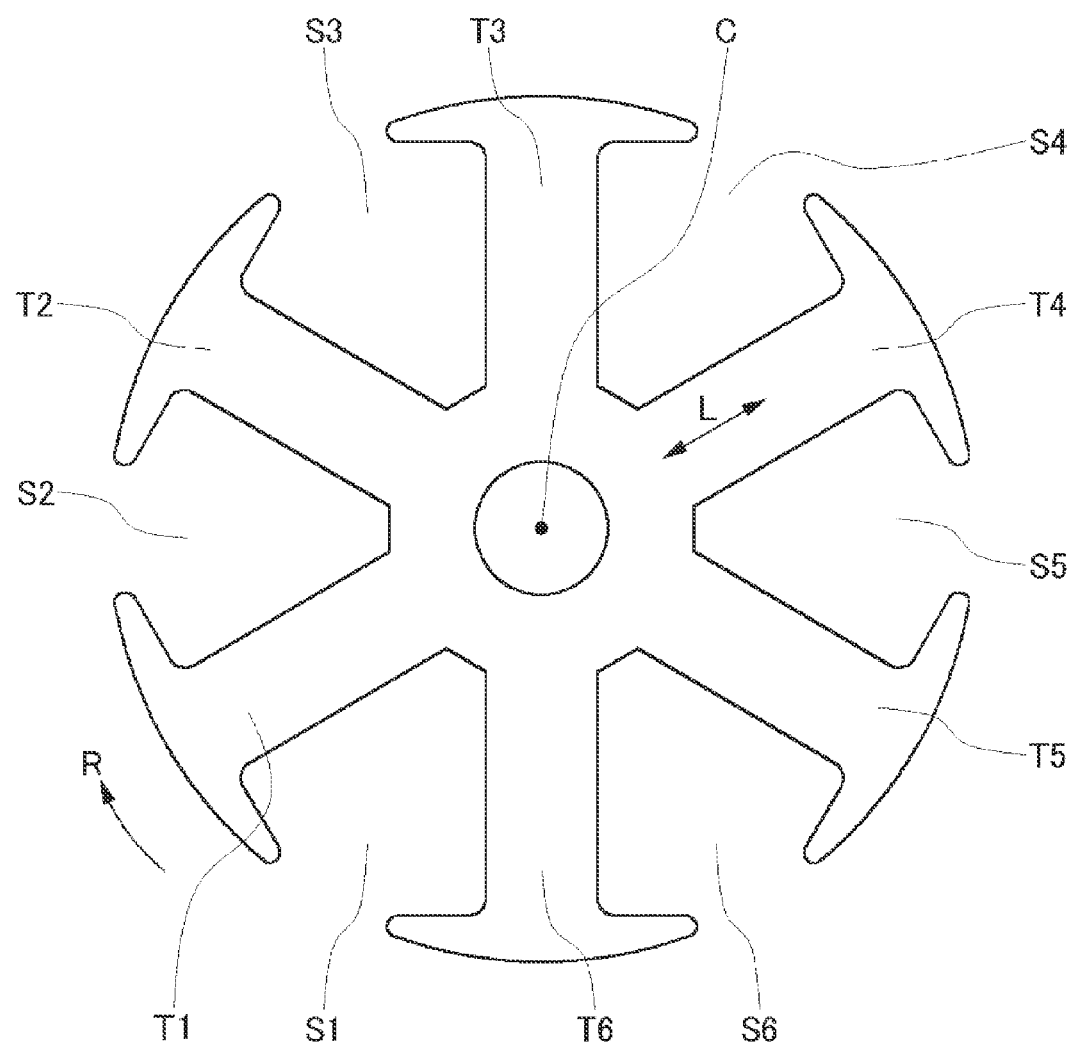
FIG. 4 is a front view of a core used for an armature according to an embodiment.

A detailed description is now given of an armature according to the present embodiment. FIG. 4 is a front view of a core used for the armature according to the present embodiment. A core 100 according to the present embodiment is produced such that a plurality of electromagnetic steel sheets each having a predetermined shape are stacked on each other.

The core 100 shown in FIG. 4 has six teeth T1 to T6 that are radially formed with a rotation axis C as the center. A first slit S1 to a sixth slit S6 are formed, between the respective teeth of the core 100, successively in the circumferential direction. The teeth T1 to T6 are each preferably of a shape such that a coil can be wound around each tooth. For example, each of the teeth T1 to T6 may be of a shape such that the cross sectional shape perpendicular to the rotation axis is an arm (I)-like one extending in a radial direction L of the core. Or each of the teeth T1 to T6 may be of a T-shape where the tip thereof is branched out on or projected from the both sides in the circumferential direction.

Figure 5:
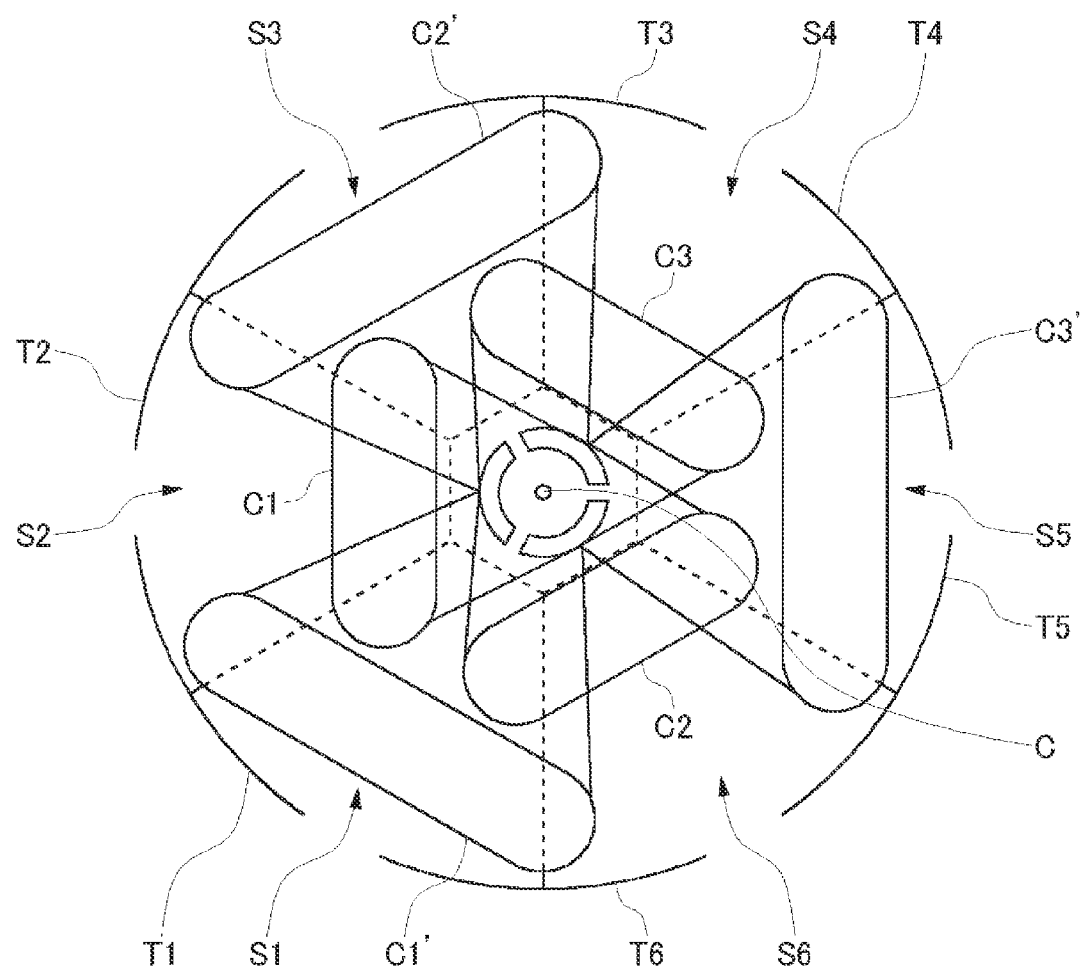
FIG. 5 is a diagram schematically showing a state of an armature where a coil is wound around a core according to an embodiment.

FIG. 5 is a diagram schematically showing a state of an armature where a coil is wound around a core according to the present embodiment. An armature 24 includes a first inside coil C1 wound between the first slit S1 and the third slit S3, a second inside coil C2 wound between the fifth slit S5 and the first slit S1, a third inside coil C3 wound between the third slit S3 and the fifth slit S5, a first outside coil C1' wound between the sixth slit S6 and the second slit S2, a second outside coil C2' wound between the second slit S2 and the fourth slit S4, and a third outside coil C3' wound between the fourth slit S4 and the sixth slit S6.

The first inside coil C1, the second inside coil C2 and the third inside coil C3 are arranged on a rotation axis side of the respective slits such that the first to third inside coils C1 to C3 form an approximately equilateral triangle as viewed from a direction of axis line of the rotation axis C. The first outside coil C1', the second outside coil C2' and the third outside coil C3' are arranged such that the first to third outside coils C1' to C3' surround the first inside coil C1, the second inside coil C2 and the third inside coil C3 and such that the first to third outside coils C1' to C3' form an approximately equilateral triangle as viewed from the direction of axis line of the rotation axis C.

In the armature 24 configured as described above, the three inside coils C1, C2 and C3 are arranged in an approximately equilateral triangle without much interfering with each other. Thus, the non-uniform arrangement thereof that may result from the interference otherwise occurring among the three coils can be minimized, and a highly symmetric (well-balanced) arrangement of the inside coils can be achieved. Similarly, the three outside coils C1', C2' and C3' are arranged in an approximately equilateral triangle without much interfering with each other. Thus, the non-uniform arrangement thereof otherwise resulting from the interference possibly occurring among the three coils can be minimized, and a highly symmetric (well-balanced) arrangement of the outside coils can be achieved. As a result, the motor 10 including the armature 24 is excellent in the weight balance while running. Thereby, the noise and vibration of the motor are reduced and therefore the motor characteristics are further improved.

Figure 6:
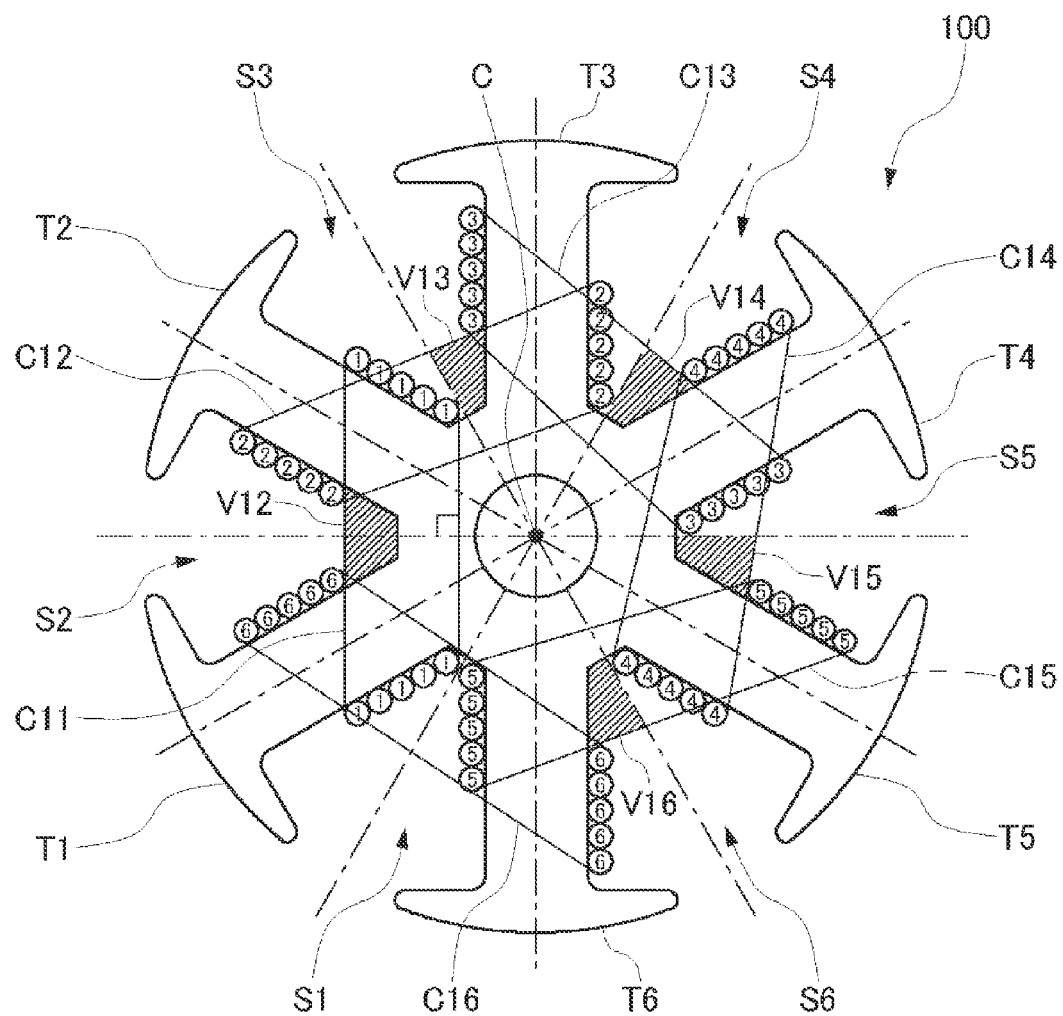
FIG. 6 is a diagram for explaining a distributed winding, which is one method of winding the coils, as a comparative example.

A description is now given of a method of winding the coils in the armature according to the present embodiment. The winding method employed in the present embodiment has various advantageous effects that has not been achieved by the conventional method. FIG. 6 is a diagram for explaining a distributed winding, which is one method of winding the coils, as a comparative example.

As shown in FIG. 6, a copper wire is first repeatedly passed through the first slit S1 and the third slit S3 in such a manner as to surround the tooth T1 and the tooth T2, so as to form a first coil C11.

After the first coil C11 has been formed, the copper wire is next repeatedly passed through the second slit S2 and the fourth slit S4 in such a manner as to surround the tooth T2 and the tooth T3, so as to form a second coil C12. At this time, the first coil C11 has already been wound in a base part of the tooth T2 and therefore the second coil C12 interferes with the first coil C11 in the second slit S2. As a result, the positions where the second coil C12 is wound around are different (displaced) between in the tooth T2 and in the tooth T3.

After the second coil C12 has been formed, the copper wire is next repeatedly passed through the third slit S3 and the fifth slit S5 in such a manner as to surround the tooth T3 and the tooth T4, so as to form a third coil C13. At this time, the second coil C12 has already been wound in a base part of the tooth T3 and therefore the third coil C13 interferes with the second coil C12 in the third slit S3. As a result, the positions where the third coil C13 is wound around are different (displaced) between in the tooth T3 and in the tooth T4.

After the third coil C13 has been formed, the copper wire is next repeatedly passed through the fourth slit S4 and the sixth slit S6 in such a manner as to surround the tooth T4 and the tooth T5, so as to form a fourth coil C14. At this time, the third coil C13 has already been wound in a base part of the tooth T4 and therefore the fourth coil C14 interferes with the third coil C13 in the fourth slit S4. As a result, the positions where the fourth coil C14 is wound around are different (displaced) between in the tooth T4 and in the tooth T5.

After the fourth coil C14 has been formed, the copper wire is next repeatedly passed through the fifth slit S5 and the first slit S1 in such a manner as to surround the tooth T5 and the tooth T6, so as to form a fifth coil C15. At this time, the fourth coil C14 has already been wound in a base part of the tooth T5 and therefore the fifth coil C15 interferes with the fourth coil C14 in the fifth slit S5. As a result, the positions where the fifth coil C15 is wound around are different (displaced) between in the tooth T5 and in the tooth T6.

After the fifth coil C15 has been formed, the copper wire is next repeatedly passed through the sixth slit S6 and the second slit S2 in such a manner as to surround the tooth T6 and the tooth T1, so as to form a sixth coil C16. At this time, the fifth coil C15 has already been wound in a base part of the tooth T6, and the first coil C11 has already been wound in a base part of the tooth T1. Hence, the sixth coil C16 interferes with the fifth coil C15 in the sixth slit S6, and the sixth coil C16 interferes with the first coil C11 in the second slit S2. As a result, the positions where the sixth coil C16 is wound around may possibly be different (displaced) between in the tooth T6 and in the tooth T1.

In an armature 102 constructed by employing the distributed winding, the four coils C12 to C15 excluding the two coils, namely the first coil C11 and the sixth coil C16, are not placed vertical to the radial direction of the core 100, and their angles formed relative to the radial direction thereof vary from one coil to another. Also, the distance between the center (center of gravity) of each coil and the rotation axis C varies from one coil to another. In addition, spaces V12 to V16 where no coil is occupied are formed in the second slit S2 to the sixth slit S6, respectively, and the shapes of the spaces V12 to V16 are not the same. For these reasons, the motor using the armature 102 constructed by employing the distributed winding still has room for improvement in the non-uniformity of arrangement of the coils.

Figure 7:
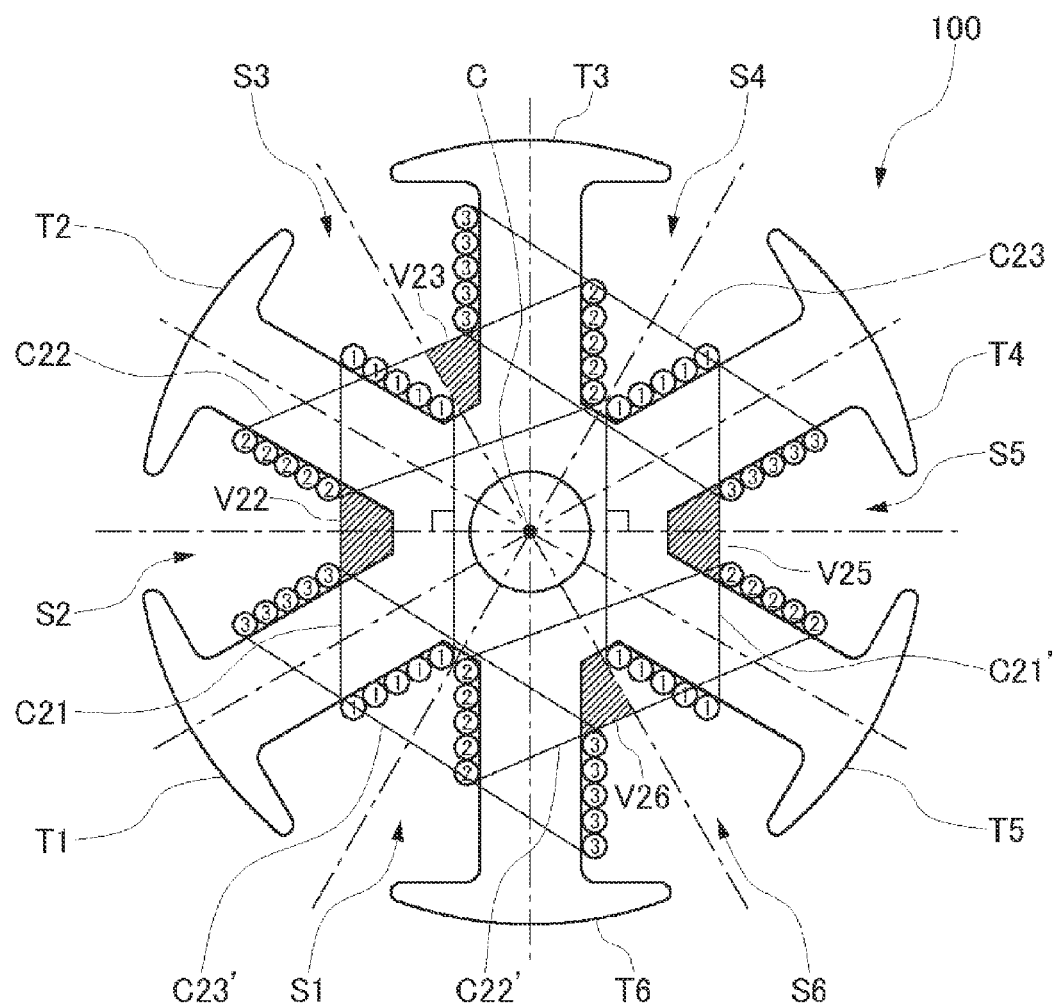
FIG. 7 is a diagram for explaining a double winding, which is one method of winding the coils, as another comparative example.

FIG. 7 is a diagram for explaining a double winding, which is one method of winding the coils, as another comparative example. The double winding is a method of forming the coils by simultaneously winding two copper wires.

As shown in FIG. 7, a copper wire is first repeatedly passed through the first slit S1 and the third slit S3 in such a manner as to surround the tooth T1 and the tooth T2 so as to form a first coil C21. Also, another first coil C21' is simultaneously formed by repeatedly passing the copper wire through the fourth slit S4 and the sixth slit S6 in such a manner as to surround the tooth T4 and the tooth T5.

After the first coils C21 and C21' have been formed, the copper wire is next repeatedly passed through the second slit S2 and the fourth slit S4 in such a manner as to surround the tooth T2 and the tooth T3 so as to form a second coil C22. Also, another second coil C22' is simultaneously formed by repeatedly passing the copper wire through the fifth slit S5 and the first slit S1 in such a manner as to surround the tooth T5 and the tooth T6. At this time, the first coil C21 has already been wound in a base part of the tooth T2 and therefore the second coil C22 interferes with the first coil C21 in the second slit S2. As a result, the positions where the second coil C22 is wound around are different (displaced) between in the tooth T2 and in the tooth T3. Similarly, the first coil C21' has already been wound in a base part of the tooth T5 and therefore the second coil C22' interferes with the first coil C21' in the fifth slit S5. As a result, the positions where the second coil C22' is wound around are different (displaced) between in the tooth T5 and in the tooth T6.

After the second coils C22 and C22' have been formed, the copper wire is next repeatedly passed through the third slit S3 and the fifth slit S5 in such a manner as to surround the tooth T3 and the tooth T4 so as to form a third coil C23. Also, another third coil C23' is simultaneously formed by repeatedly passing the copper wire through the sixth slit S6 and the second slit S2 in such a manner as to surround the tooth T6 and the tooth T1. At this time, the second coil C22 has already been wound in a base part of the tooth T3, and the first coil C21' has already been wound in a base part of the tooth T4. Thus, the third coil C23 interferes with the second coil C22 and the first coil C21' in the third slit S3 and the fifth slit S5, respectively. As a result, the positions where the third coil C23 is wound around may possibly be different (displaced) between in the tooth T3 and in the tooth T4. Similarly, the second coil C22' has already been wound in a base part of the tooth T6, and the first coil C21 has already been wound in a base part of the tooth T1. Thus, the third coil C23' interferes with the second coil C22' and the first coil C21 in the sixth slit S6 and the second slit S2, respectively. As a result, the positions where the third coil C23' is wound around may possibly be different (displaced) between in the tooth T6 and in the tooth T1.

In an armature 104 constructed by employing the double winding, the two coils C22 and C22' excluding the four coils, namely the first coils C21 and C21' and the third coils C23 and C23', are not placed vertical to the radial direction of the core 100, and their angles formed relative to the radial direction thereof vary from one coil to another. Also, the distance between the center (center of gravity) of each of the first coil C21 (C21'), the second coil C22 (C22') and the third coil C23 (C23') and the rotation axis C varies from one coil to another. In addition, spaces V22, V23, V25 and V26 where no coil is occupied are formed in the second slit S2, the third slit S3, the fifth slit S5 and the sixth slit S6, respectively, and the shapes of the spaces V22, V23, V25 and V26 are not the same. For these reasons, the motor using the armature 104 constructed by employing the double winding has improved over the armature 102 constructed by employing the distributed winding regarding the non-uniformity of arrangement of the coils but still has room for improvement in other respects. Also, there is a problem of an increased cost of a manufacturing apparatus because a double flyer apparatus needs to be used for the double winding.

Based on the knowledge gained through the above-described winding methods, the inventors of the present invention had conceived and designed methods capable of further improving the non-uniformity of arrangement of the coils.

Figure 8:
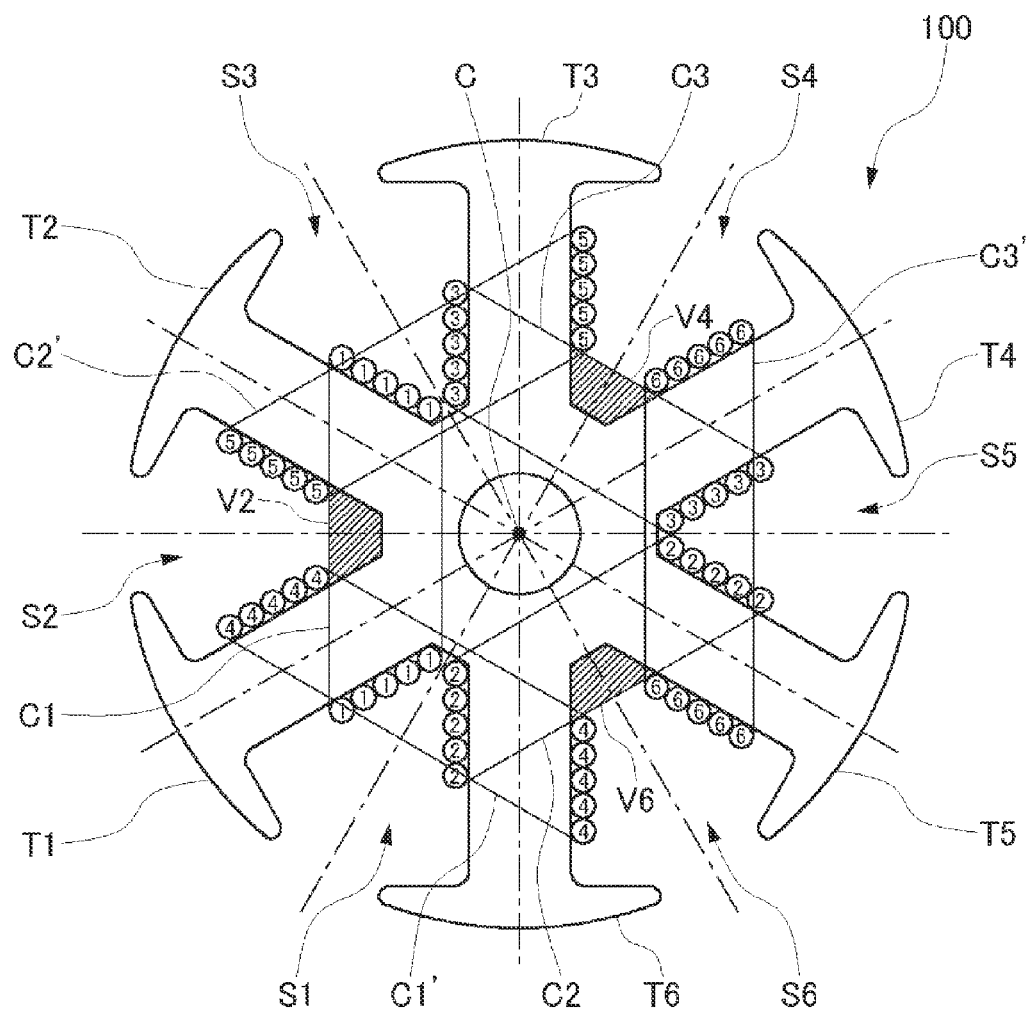
FIG. 8 is a diagram for explaining a method of winding the coils according to an embodiment.

FIG. 8 is a diagram for explaining a method of winding the coils according to the present embodiment. As shown in FIG. 8, a copper wire is first repeatedly passed through the first slit S1 and the third slit S3 in such a manner as to surround the tooth T1 and the tooth T2, so as to form a first inside coil C1.

After the first inside coil C1 has been formed, the copper wire is next repeatedly passed through the fifth slit S5 and the first slit S1 in such a manner as to surround the tooth T5 and the tooth T6, so as to form a second inside coil C2. At this time, no coils other than the second inside coil C2 is wound in base parts of the tooth T5 and the tooth T6 and therefore the second inside coil C2 is wound in the base parts of the tooth T5 and the tooth T6 without interfering with the other coils.

After the second inside coil C2 has been formed, the copper wire is next repeatedly passed through the third slit S3 and the fifth slit S5 in such a manner as to surround the tooth T3 and the tooth T4, so as to form a third inside coil C3. At this time, no coils other than the third inside coil C3 is wound in base parts of the tooth T3 and the tooth T4 and therefore the third inside coil C3 is wound in the base parts of the tooth T3 and the tooth T4 without interfering with the other coils.

After the third inside coil C3 has been formed, the copper wire is next repeatedly passed through the sixth slit S6 and the second slit S2 in such a manner as to surround the tooth T6 and the tooth T1, so as to form a first outside coil C1'. At this time, the second inside coil C2 is wound in the base part of the tooth T6, and the first inside coil C1 is wound in the base part of the tooth T1. Thus, the first outside coil C1' interferes with the second inside coil C2 in the sixth slit S6 and interferes with the first inside coil C1 in the second slit S2. However, since the shape of the first inside coil C1 and that of the second inside coil C2 are approximately identical to each other, the distances between the positions, where the first outside coil C1' are wound around, and the rotation axis C are the same in the tooth T6 and the tooth T1, respectively.

After the first outside coil C1' has been formed, the copper wire is next repeatedly passed through the second slit S2 and the fourth slit S4 in such a manner as to surround the tooth T2 and the tooth T3, so as to form a second outside coil C2'. At this time, the first inside coil C1 is wound in the base part of the tooth T2, and the third inside coil C3 is wound in the base part of the tooth T3. Thus, the second outside coil C2' interferes with the first inside coil C1 in the second slit S2 and interferes with the third inside coil C3 in the fourth slit S4. However, since the shape of the first inside coil C1 and that of the third inside coil C3 are approximately identical to each other, the distances between the positions, where the second outside coil C2' are wound around, and the rotation axis C are the same in the tooth T2 and the tooth T3, respectively.

After the second outside coil C2' has been formed, the copper wire is next repeatedly passed through the fourth slit S4 and the sixth slit S6 in such a manner as to surround the tooth T4 and the tooth T5, so as to form a third outside coil C3'. At this time, the third inside coil C3 is wound in the base part of the tooth T4, and the second inside coil C2 is wound in the base part of the tooth T5. Thus, the third outside coil C3' interferes with the third inside coil C3 in the fourth slit S4 and interferes with the second inside coil C2 in the sixth slit S6. However, since the shape of the second inside coil C2 and that of the third inside coil C3 are approximately identical to each other, the distances between the positions, where the third outside coil C3' are wound around, and the rotation axis C are the same in the tooth T4 and the tooth T5, respectively.

In the armature 24 constructed by employing such a method as described above, all the coils are placed approximately vertical to the radial direction of the core 100. Note that it suffices that each coil be placed substantially and practically vertical to the radial direction of the core 100 and that there may be cases where a coil is slightly tilted without departing from the scope of the aim of the present invention. Also, the distance between the center (center of gravity), of each of the first inside coil C1, the second inside coil C2 and the third inside coil C3, and the rotation axis C is constant. Similarly, the distance between the center (center of gravity), of each of the first outside coil C1', the second outside coil C2' and the third outside coil C3', and the rotation axis C is constant. In addition, spaces V2, V4 and V6 where no coil is occupied are formed in the second slit S2, the fourth slit S4 and the sixth slit S6, and the shapes of the spaces V2, V4 and V6 are the same. Thus, in the motor using the armature 24 constructed according to the present embodiment, the problem of the non-uniformity of arrangement of the coils is further improved over the armatures 102 and 104 constructed by employing the distributed winding and the double winding.

Also, this armature winding method according to the present embodiment allows the wires to be continuously connected in the order of the first inside coil C1, the second inside coil C2, the third inside coil C3, the first outside coil C1', the second outside coil C2' and the third outside coil C3' in a unicursal manner. Thus, a low-cost single flyer apparatus can be used. As a result, the armatures can be manufactured by a lower-cost apparatus without using the apparatus called a double flyer capable of simultaneously forming two coils.

As described above, the armature 24 includes the core 100 having the six teeth, which are radially formed with the rotation axis C as the center, and the six coils, where each coil is wound around each set of teeth containing at least two teeth. The six coils have three inside coils (C1, C2, C3) placed on a rotation axis side of the teeth and three outside coils (C1', C2', C3') placed outside the inside coils.

The first inside coil C1 is wound around the teeth T1 and T2, and the second inside coil C2, which is adjacent to the first inside coil C1, is wound around the teeth T5 and T6. Similarly, the third inside coil C3 adjacent thereto is wound around the teeth T3 and T4. In other words, the three inside coils are circularly arranged so that the inside coils adjacent to each other are not wound around the same tooth.

The first outside coil C1' is wound around the teeth T6 and T1, and the second outside coil C2', which is adjacent to the first outside coil C1', is wound around the teeth T2 and T3. Similarly, the third outside coil C3' adjacent thereto is wound around the teeth T4 and T5. In other words, the three outside coils are circularly arranged so that the outside coils adjacent to each other are not wound around the same tooth. Thus, the inside coils are wound around a first set of combinations of teeth, namely a combination of T1 and T2, a combination of T3 and T4, and a combination of T5 and T6; the three outside coils are wound around a second set of combinations of teeth, namely a combination of T2 and T3, a combination of T4 and T5, and a combination of T6 and T1. Hence, the second set of combination of teeth for the outside coils differ from the first set of combinations of teeth for the inside coils.

By employing this embodiment, the three inside coils placed on the rotation axis side of the teeth are circularly arranged so that the inside coils adjacent to each other are not wound around the same tooth. In other words, a plurality of inside coils are wound around predetermined teeth without much interfering with each other, so that the non-uniform arrangement thereof resulting from the interference occurring among the plurality of coils can be minimized and a highly symmetric (well-balanced) arrangement of the inside coils can be achieved. Similarly, a plurality of outside coils are circularly arranged so that the outside coils adjacent to each other are not wound around the same tooth. In other words, the plurality of outside coils are wound around predetermined teeth without much interfering with each other, so that the non-uniform arrangement thereof resulting from the interference occurring among the plurality of coils can be minimized and a highly symmetric (well-balanced) arrangement of the outside coils can be achieved. Also, the outside coils are wound around the second set of combinations of teeth, which are different from the first set of combinations of teeth around which the inside coils are wound. This achieves rotational characteristics having smoother torque fluctuations than those in the case where the combinations of teeth for the outside coils and the combinations thereof for the inside coils are the same.

The "different combinations of teeth", around which the outside coils are wound, includes not only a case where the teeth in the second set of combinations differ from all the teeth in the first set of combinations but also a case where the teeth in the second set of combinations partially differ therefrom as with the armature 24. The shape meant in the expression "circularly arranged" may include not only a circular shape but also a polygonal shape such as a quadrangular, a rectangular (square) or pentagonal shape.

A description is now given of other exemplary embodiments according to the present embodiments. Table 1 lists the structure of the armatures shown in FIG. 8 and the structures of armatures according to a first exemplary embodiment to a sixth exemplary embodiment.

TABLE 1

|  | The number (m) of core grooves (slits) (=The number of teeth) | The number (n) of teeth for which each coil strides across | (m/n)-sided polygon | The number of layers ([m/(m/n)] = n) | Rotation angle (degrees) |
| --- | --- | --- | --- | --- | --- |
| Embodiments | 6 | 2 | 3 | 2 | 60 |
| 1st exemplary embodiment | 8 | 2 | 4 | 2 | 45 |
| 2nd exemplary embodiment | 9 | 3 | 3 | 3 | 40 |
| 3rd exemplary embodiment | 10 | 2 | 5 | 2 | 36 |
| 4th exemplary embodiment | 12 | 2 | 6 | 2 | 30 |
| 5th exemplary embodiment | 12 | 3 | 4 | 3 | 30 |
| 6th exemplary embodiment | 12 | 4 | 3 | 4 | 30 |

Figure 9A:
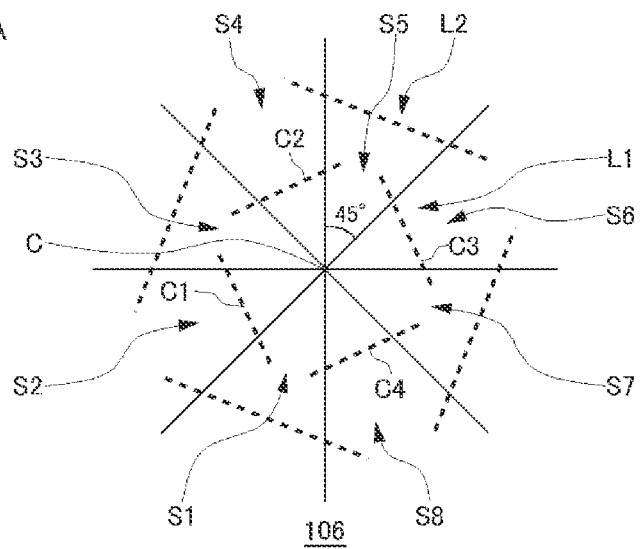
FIG. 9A schematically shows a structure of an armature according to a first exemplary embodiment.
Figure 9B:
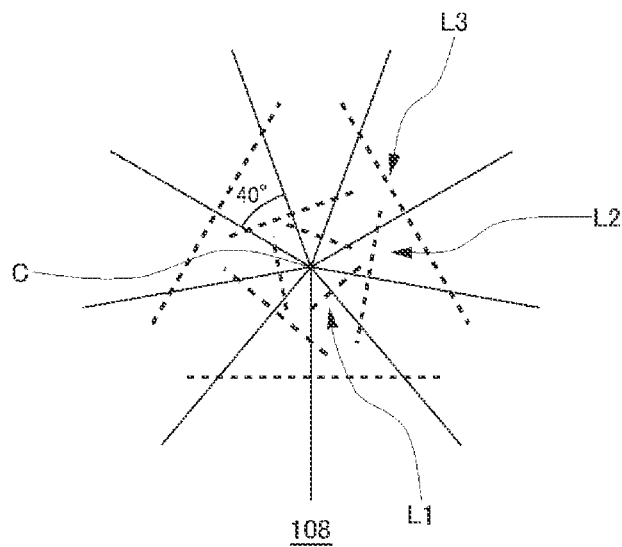
FIG. 9B schematically shows a structure of an armature according to a second exemplary embodiment.
Figure 9C:
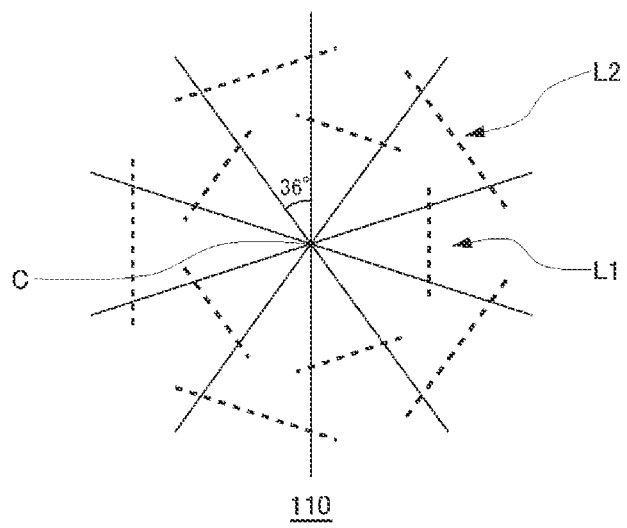
FIG. 9C schematically shows a structure of an armature according to a third exemplary embodiment.
Figure 10A:
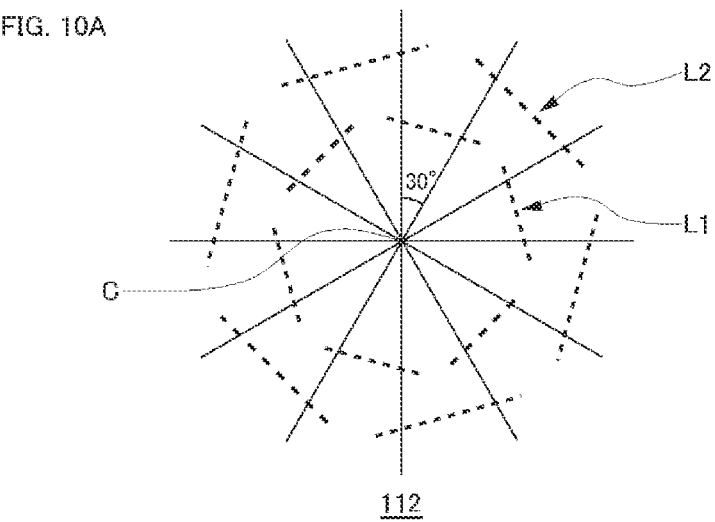
FIG. 10A schematically shows a structure of an armature according to a fourth exemplary embodiment.
Figure 10B:
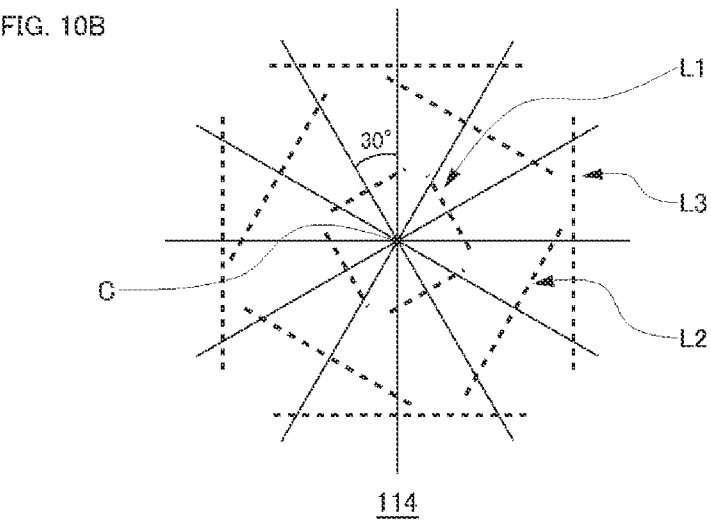
FIG. 10B schematically shows a structure of an armature according to a fifth exemplary embodiment.
Figure 10C:
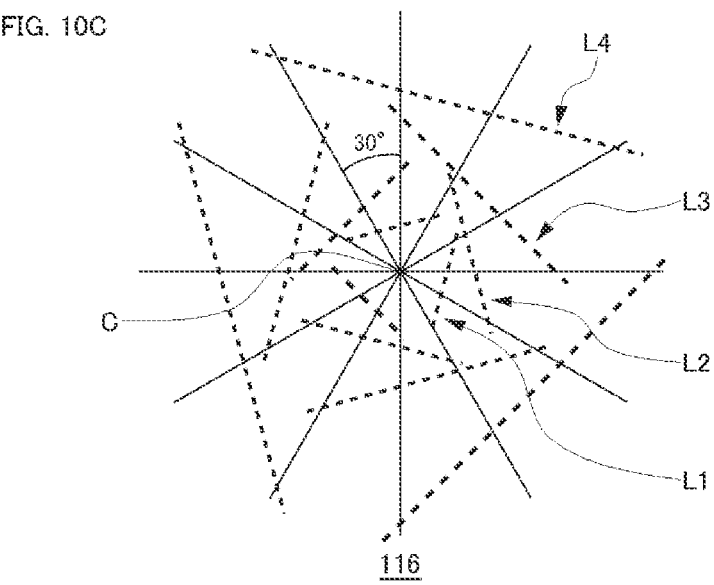
FIG. 10C schematically shows a structure of an armature according to a sixth exemplary embodiment.

FIG. 9A schematically shows a structure of an armature according to a first exemplary embodiment. FIG. 9B schematically shows a structure of an armature according to a second exemplary embodiment. FIG. 9C schematically shows a structure of an armature according to a third exemplary embodiment. FIG. 10A schematically shows a structure of an armature according to a fourth exemplary embodiment. FIG. 10B schematically shows a structure of an armature according to a fifth exemplary embodiment. FIG. 10C schematically shows a structure of an armature according to a sixth exemplary embodiment. In each of FIGS. 9A to 10C, the solid line indicates the teeth of a core, and the dotted line indicates the coils.

In an armature 106 shown in FIG. 9A, the number m of core grooves (teeth) is "8" and the number n of teeth each coil strides (extends) across is "2". And a plurality of coils construct two layers in the armature 106. In a first layer L1 located inside in this two-layer structure, four coils are so arranged as to form a first square; in a second layer L2 located outside the first layer L1, four coils are so arranged as to form a second square. The first square and the second square are similar figures to each other and are arranged in predetermined positions such that the first square is rotated by 45 degrees relative to the second square and vice versa with the rotation axis C as the center.

In an armature 108 shown in FIG. 9B, the number m of core grooves (teeth) is "9" and the number n of teeth each coil strides across is "3". And a plurality of coils construct three layers in the armature 108. In a first layer L1 located as the innermost layer in this three-layer structure, three coils are so arranged as to form a first triangle. In a second layer L2 located outside the first layer L1, three coils are so arranged as to form a second triangle. In a third layer L3 (located as the outermost layer in the three-layer structure) located outside the second layer L2, three coils are so arranged as to form a third triangle. These first to third triangles are similar figures to each other and are arranged such that each of the first to third triangles is rotated by 40 degrees relative to another triangle thereof in between adjacent layers with the rotation axis C as the center.

In an armature 110 shown in FIG. 9C, the number m of core grooves (teeth) is "10" and the number n of teeth each coil strides across is "2". And a plurality of coils construct two layers in the armature 110. In a first layer L1 located inside in this two-layer structure, five coils are so arranged as to form a first pentagon; in a second layer L2 located outside the first layer L1, five coils are so arranged as to form a second pentagon. The first pentagon and the second pentagon are similar figures to each other and are arranged in predetermined positions such that the first pentagon is rotated by 36 degrees relative to the second pentagon and vice versa with the rotation axis C as the center.

In an armature 112 shown in FIG. 10A, the number m of core grooves (teeth) is "12" and the number n of teeth each coil strides across is "2". And a plurality of coils construct two layers in the armature 112. In a first layer L1 located inside in this two-layer structure, six coils are so arranged as to form a first hexagon; in a second layer L2 located outside the first layer L1, six coils are so arranged as to form a second hexagon. The first hexagon and the second hexagon are similar figures to each other and are arranged in predetermined positions such that the first hexagon is rotated by 30 degrees relative to the second hexagon and vice versa with the rotation axis C as the center.

In an armature 114 shown in FIG. 10B, the number m of core grooves (teeth) is "12" and the number n of teeth each coil strides across is "3". And a plurality of coils construct three layers in the armature 114. In a first layer L1 located as the innermost layer in this three-layer structure, four coils are so arranged as to form a first square. In a second layer L2 located outside the first layer L1, four coils are so arranged as to form a second square. In a third layer L3 (located as the outermost layer in the three-layer structure) located outside the second layer L2, four coils are so arranged as to form a third square. These first to third squares are similar figures to each other and are arranged such that each of the first to third squares is rotated by 30 degrees relative to another square thereof in between adjacent layers with the rotation axis C as the center.

In an armature 116 shown in FIG. 10C, the number m of core grooves (teeth) is "12" and the number n of teeth each coil strides across is "4". And a plurality of coils construct four layers in the armature 116. In a first layer L1 located as the innermost layer in this four-layer structure, three coils are so arranged as to form a first triangle. In a second layer L2 located outside the first layer L1, three coils are so arranged as to form a second triangle. In a third layer L3 located outside the second layer L2, three coils are so arranged as to form a third triangle. In a fourth layer L4 (located as the outermost layer in the four-layer structure) located outside the third layer L3, three coils are so arranged as to form a fourth triangle. These first to fourth triangles are similar figures to each other and are arranged such that each of the first to fourth triangles is rotated by 30 degrees relative to another triangle thereof in between adjacent layers with the rotation axis C as the center.

The features of the armatures according to the present embodiment and the respective exemplary embodiments are described as follows. That is, the armature includes the core having m teeth (m being an integer greater than or equal to "6"), which are radially formed with the rotation axis as the center, and a plurality of coils, where each coil is wound around each set of n teeth (n being an integer such that m/n is greater than or equal to "3"). The plurality of coils has m/n inside coils placed on a rotation axis side of the teeth and m/n outside coils placed outside the inside coils. The m/n inside coils are arranged such that the m/n inside coils form a polygon, having m/n sides, as viewed from a direction of axis line of the rotation axis C. The m/n outside coils are arranged such that the m/n outside coils form a polygon, having m/n sides, as viewed from the direction of axis line of the rotation axis C. The outside coils are arranged such that the phase of the outside coils is shifted by degrees, which are [360 degrees divided by m], relative to adjacent inside coils with the rotation axis as the center. Coils may be further provided outside the aforementioned outside coils. In this case, assume that the inside coils are defined to belong to a first layer and that the outside coils, adjacent to this first layer, which are provided outside those of the first layer are defined to belong to a second layer. Assume similarly that the outside coils adjacent to this second layer, which are provided outside those of the second layer are defined to belong to a third layer and that the outside coils adjacent to this third layer, which are provided outside those of the third layer are defined to belong to a fourth layer. Then the number of layers formed can be expressed by m/(m/n).

In the armature according to the embodiment and each of the exemplary embodiments, m/n inside coils are so arranged as to form a (m/n)-gon, as viewed from the direction of axis line of the rotation axis, and m/n outside coils are so arranged as to form a (m/n)-gon, as viewed from the direction of axis line of the rotation axis. And these inside coils and these outside coils are arranged such that the inside coils and the outside coils form mutually similar shapes. Also, the outside coils are arranged such that the phase of the outside coils is shifted by degrees, which equal to [360°/m], relative to their adjacent inside coils with the rotation axis as the center. As a result, each coil is arranged at uniform angular intervals, thereby achieving the rotational characteristics having smooth torque fluctuations.

Thus, the armature according to each of the above-described exemplary embodiment achieves the same advantageous effects as those of the above-described armature 24.

Also, in the armature according to the embodiment and each of the exemplary embodiments, a plurality of slits, of the slits formed between adjacent teeth, where no inside coils is inserted, are such that the shapes of spaces formed on a rotation axis side apart from the outside coils are practically identical to each other. For example, in the armature 106 shown in FIG. 9A, the shapes of the respective spaces formed on a rotation axis C side, where no inside coils (C1 to C4) is inserted, are practically the same in the four slits (S2, S4, S6, and S8) of the slits (S1 to S8) formed between adjacent teeth (see FIG. 8). In other words, if there are four such spaces, the four inside coils (or the four outside coils) will be provided such that the four coils are four-fold symmetry about the rotation axis (square). In this manner, the armature coil according to each of the exemplary embodiments keeps a well-balanced rotation while it is rotating and therefore the vibration occurring when each of such armatures is used for the motor is suppressed.

Figure 12A:
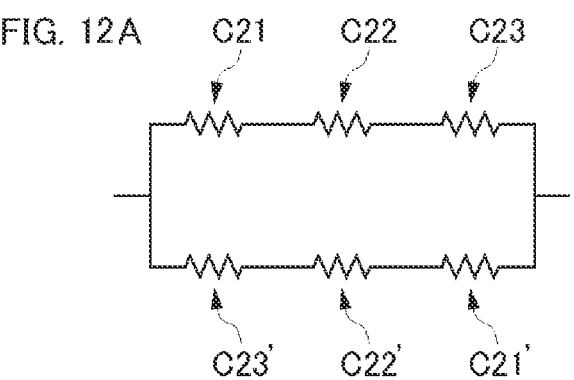
FIG. 12A is a circuit configuration of an armature in a state of FIG. 11A.
Figure 12B:
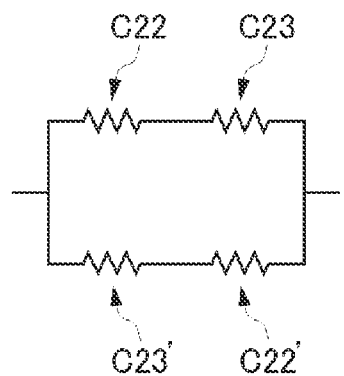
FIG. 12B is a circuit configuration of an armature in a state of FIG. 12B.

A description is now given of a relation between the contact position of a brush with a commutator during motor rotation and a circuit configuration of an armature in such a state. FIG. 11A is a diagram schematically showing a state where the brush is in contact with the commutator of the armature shown in FIG. 7. FIG. 11B is a diagram schematically showing a state where the armature of FIG. 11A is rotated by 30 degrees. FIG. 12A is a circuit configuration of the armature in the state of FIG. 11A. FIG. 12B is a circuit configuration of the armature in the state of FIG. 11B.

A commutator 118 equipped with the armature 104 is in contact with a pair of carbon brushes 120a and 120b. The commutator 118 is divided into six segments 118a to 118f; one segment 118a of the segments 118a to 118f is in contact with the carbon brush 120a while another segment 118d thereof is in contact with the carbon brush 120b.

In this case, as shown in FIG. 12A, a first circuit composed of the first coil C21, the second coil C22 and the third coil C23 are formed such that the first coil C21 to the third coil C23 are connected in series with each other. Also, in this case, a second circuit composed of the first coil C21', the second coil C22' and the third coil C23' are formed such that the first coil C21' to the third coil C23' are connected in series with each other. And the first circuit and the second circuit are connected in parallel with each other. If the resistance of each coil is constant and denoted by R, the resistance of the entire armature 104 will be (3/2)R.

In the armature 104 shown in FIG. 11B, the carbon brush 120a is in contact with the two segments 118a and 118b of the commutator 118 in such a manner as to bridge over the opening between the segments 118a and 118b. Also, the carbon brush 120b is in contact with the two segments 118d and 118e thereof in such a manner as to bridge over the opening between the segments 118d and 118e.

In this case, as shown in FIG. 12B, a third circuit composed of the second coil C22 and the third coil C23 are formed such that the second and third coils C22 and C23 are connected in series with each other. Also, in this case, a fourth circuit composed of the second coil C22' and the third coil C23' are formed such that the second and third coils C22' and C23' are connected in series with each other. And the third circuit and the fourth circuit are connected in parallel with each other. Note that no current flows through the first coils C21 and C21'. If the resistance of each coil is assumed to be constant and denoted by R, the resistance of the entire armature 104 will be R.

Thus, the current flowing in the armature 104 when the carbon brushes 120a and 120b are in contact with the two segments of the commutator 118 in such a manner as to bridge over the opening therebetween is 1.5 times the current flowing when the carbon brushes 120a and 120b are in contact therewith without bridging over the opening therebetween.

Figure 13A:
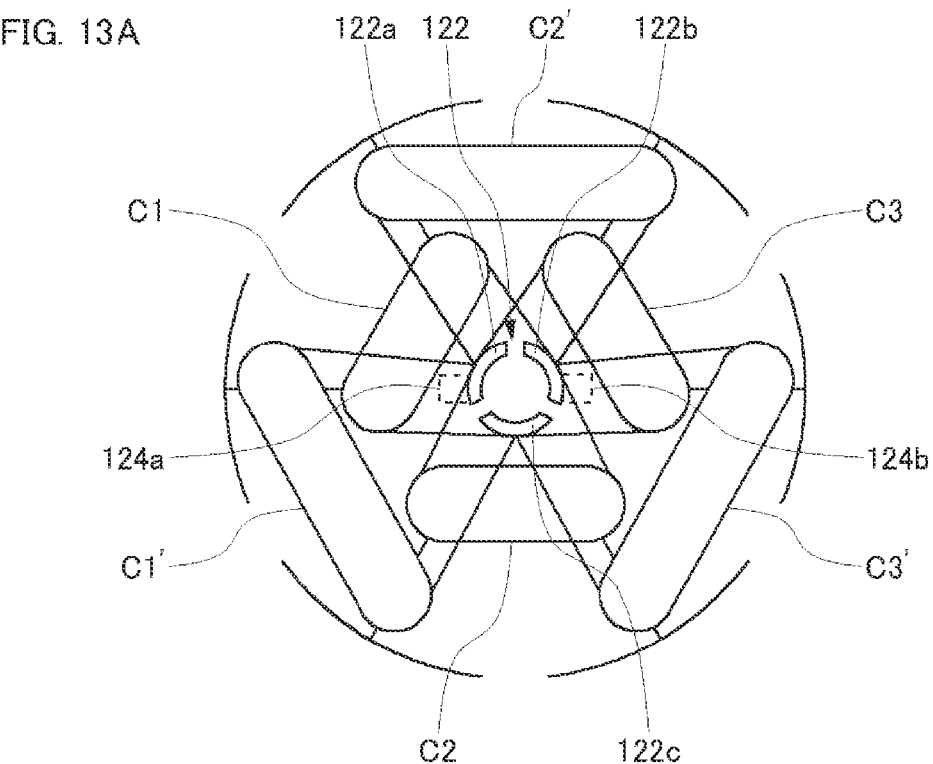
FIG. 13A is a diagram schematically showing a state where a brush is in contact with a commutator of an armature shown in FIG. 8.
Figure 13B:
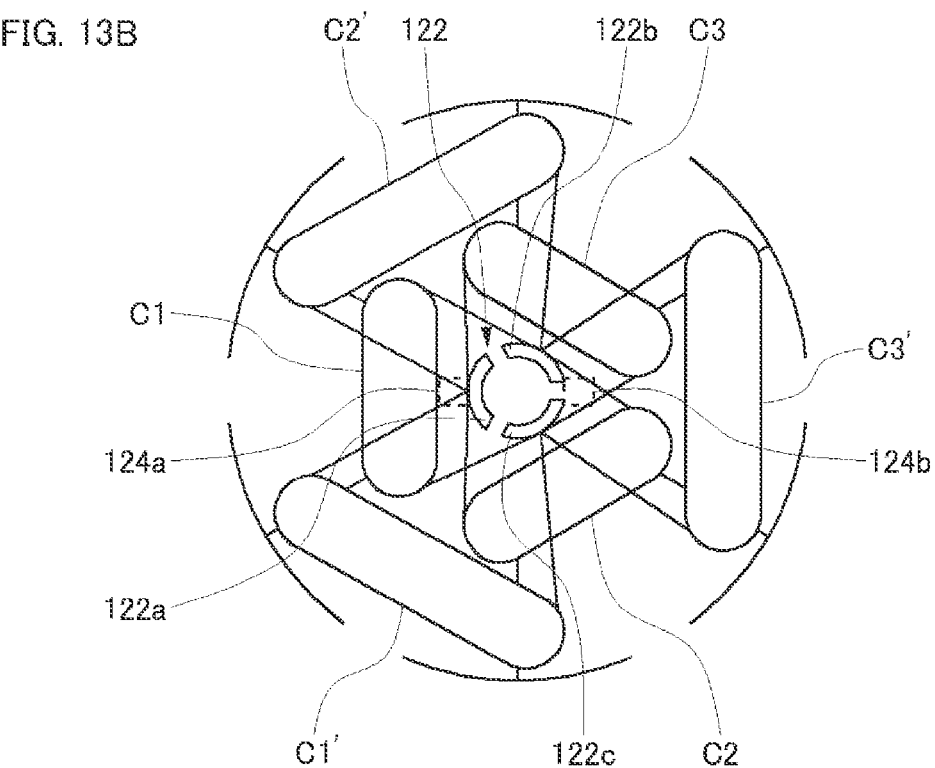
FIG. 13B is a diagram schematically showing a state where the armature of FIG. 13A is rotated by 30 degrees.
Figure 14A:
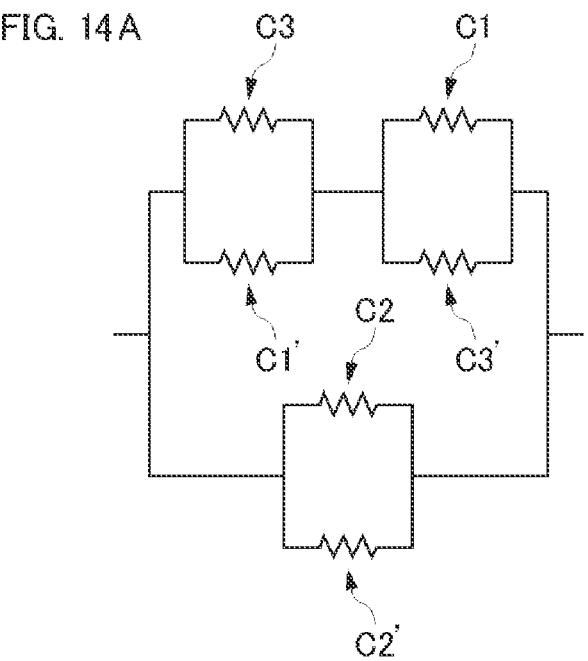
FIG. 14A is a circuit configuration of an armature in a state of FIG. 13A.
Figure 14B:
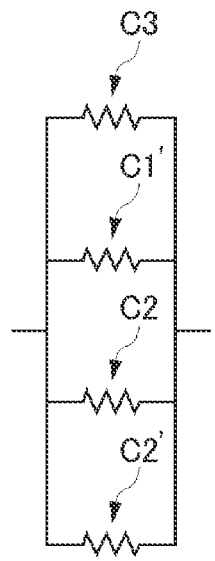
FIG. 14B is a circuit configuration of an armature in a state of FIG. 13B.

A detailed description is now given of an armature 24 according to the present embodiment. FIG. 13A is a diagram schematically showing a state where the brush is in contact with the commutator of the armature shown in FIG. 8. FIG. 13B is a diagram schematically showing a state where the armature of FIG. 13A is rotated by 30 degrees. FIG. 14A is a circuit configuration of the armature in a state of FIG. 13A. FIG. 14B is a circuit configuration of the armature in the state of FIG. 13B.

A commutator 122 equipped with the armature 24 is in contact with a pair of carbon brushes 124a and 124b. The commutator 122 is divided into three segments 122a to 122c along a circumferential direction; only one segment 122a of the segments 122a to 122c is in contact with the carbon brush 124a while only another segment 122b thereof is in contact with the carbon brush 124b.

A description is now given of a connection state of each segment and each coil. The second inside coil C2 and the second outside coil C2' are connected in parallel with each other in between the segment 122a and the segment 122b. The first inside coil C1 and the third outside coil C3' are connected in parallel with each other in between the segment 122b and the segment 122c. The third inside coil C3 and the first outside coil C1' are connected in parallel with each other in between the segment 122c and the segment 122a.

In this case, as shown in FIG. 14A, the first inside coil C1 and the third outside coil C3' are connected in parallel with each other in between the segment 122a and the segment 122b. Also, the second inside coil C2 and the second outside coil C2' are connected in parallel with each other in therebetween. Also, the third inside coil C3 and the first outside coil C1' are connected in parallel with each other in therebetween. Also, the first inside coil C1 and the third inside coil C3 are connected in series with each other in therebetween. Also, the first outside coil C1' and the third outside coil C3' are connected in series with each other in therebetween. Also, the first inside coil C1, the third outside coil C3', the second inside coil C2, and the second outside coil C2' are connected in parallel with each other in therebetween. If the resistance of each coil is constant and denoted by R, the resistance of the entire armature 24 will be (⅓)R.

In the armature 24 shown in FIG. 13B, the carbon brush 124a is in contact with only one segment 122a of the commutator 122 while the carbon brush 124b is in contact with the two segments 122b and 122c thereof in such a manner as to bridge over the opening between the segments 122b and 122c.

In this case, as shown in FIG. 14B, the second inside coil C2, the third inside coil C3, the first outside coil C1' and the second outside coil C2' are connected in parallel with each other. Note that no current flows through the first inside coil C1 and the third outside coil C3'. If the resistance of each coil is assumed to be constant and denoted by R, the resistance of the entire armature 24 will be (¼)R.

Thus, the current flowing in the armature 24 when the carbon brush 124b is in contact with the two segments of the commutator 122 in such a manner as to bridge over the opening between the two segments thereof is 4/3 times the current flowing when the carbon brush 124b is in contact therewith without bridging over the opening therebetween. In other words, the change in current of the armature 24 during rotation is smaller than the change in current of the armature 104 during rotation.

In other words, the armature 24 has a smaller difference (change) in resistance values between when the carbon brush 124b is in contact with the two segments of the commutator 122 in such a manner as to bridge over the opening between the two segments thereof and when the carbon brush 124b is in contact therewith without bridging over the opening therebetween; as a result, the torque ripple is reduced. This enhances the stability of the armature 24 during rotation and is effective in the reduction of vibration.

Also, while in the armature 24, as shown in FIGS. 13A and 13B, the first inside coil C1 and the third outside coil C3' are arranged parallel to each other and are positioned 180 degrees in opposite of each other with the rotation axis as the center. Similarly, the second inside coil C2 and the second outside coil C2' are arranged parallel to each other and are positioned 180 degrees in opposite of each other with the rotation axis as the center. Similarly, the third inside coil C3 and the first outside coil C1' are arranged parallel to each other and are positioned 180 degrees in opposite of each other with the rotation axis as the center.

As described and shown above, the armature 24 has three sets of coils where the coils in each set are arranged parallel to each other and positioned 180 degrees in opposite of each other. This means that the state, where the current flows through one of each set of coils while no current flows through the other thereof, does not occur. In other words, the two coils, which are arranged parallel to each other and positioned 180 degrees in opposite of each other, are simultaneously rectified and therefore the stability of the armature 24 during rotation is enhanced.

Also, while in the armature 24 a pair of carbon brushes 124a and 124b are in contact with commutator 122, at least four of the first inside coil C1, the second inside coil C2, the third inside coil C3, the first outside coil C1', the second outside coil C2' and the third outside coil C3' are connected in parallel with each other. Thus, although the armature 24 is equipped with the same number of coils (namely, six coils) as that in the armature 104 and the resistance of each coil in the armature 24 is the same as that in the armature 104, the resistance of the entire armature 24 is considerably smaller than that of the entire armature 104.

Hence, if the resistance of each coil in the armature 24 is set such that, for example, the current flowing through the armature 24 in the state shown in FIG. 13A flows through the same way as the current flowing through the armature 104 in the state shown in FIG. 11A, the resistance of each coil in the armature 24 will be preferably 4.5 times that in the armature 104. If the length of each coil remains the same, a copper wire having smaller cross-sectional area may be used. More specifically, the copper wire whose cross-sectional area in the armature 24 is (1/4.5) times that in the armature 104 may be used. As a result, the workability at the time when the coils are wound around on the core is improved and the cost of material used can be reduced. Further, the motor characteristics are made equal and therefore the length of coils may be made longer.

In this manner, the armature 24 includes the shaft, which penetrates the center of the core 100, and the commutator 122, which is fixed to the shaft and which rotates with the armature. Here, the commutator 122 functions as an electrical switch that periodically reverse the current direction between the rotor and an external circuit. The commutator 122 is divided into three segments the number of which is equal to the number of the inside coils or the outside coils. Thus, the number (three) of segments for the commutator 122 is a half of the total number (six) of coils. This means that the size of each segment can be made larger. Hence, the manufacture of the commutators 122 can be made easier and the workability in assembling them can be improved as well.

In each segment of the commutator 122, it suffices that there be only a single stopper for stopping the ends of coils. In this case, one stopper stops the ends of four coils. Accordingly, the stopper will be of a larger size, and the stopper needs to stop an end of a first coil and simultaneously stop one end of another coil. For these reasons, there is room for improvement in the workability.

In the light of this, each of the segments of the commutator may have a first stopper, by which at least an end of the inside coil is stopped, and a second stopper, by which at least an end of the outside coil is stopped. Thereby, even though the ends of a plurality of coils need to be stopped by each segment, the ends thereof do not need to be stopped by the same stopper. This allows the size of stopper to be smaller. Also, the manufacturing is easier than when the end of the next coil is stopped while the end of the other coil is stopped.

As shown in FIG. 2 and other Figures, the motor according to the present embodiment includes the cylindrical housing 12, the magnet 20, having at least a pair of magnets poles, as the stator, the above-described armature placed counter to the stator, and a pair of or a plurality of pairs of brushes that are so provided as to slide the outer peripheral surface of the commutator. This can realize a DC motor whose characteristics have been improved over the conventional one.

Figure 15:
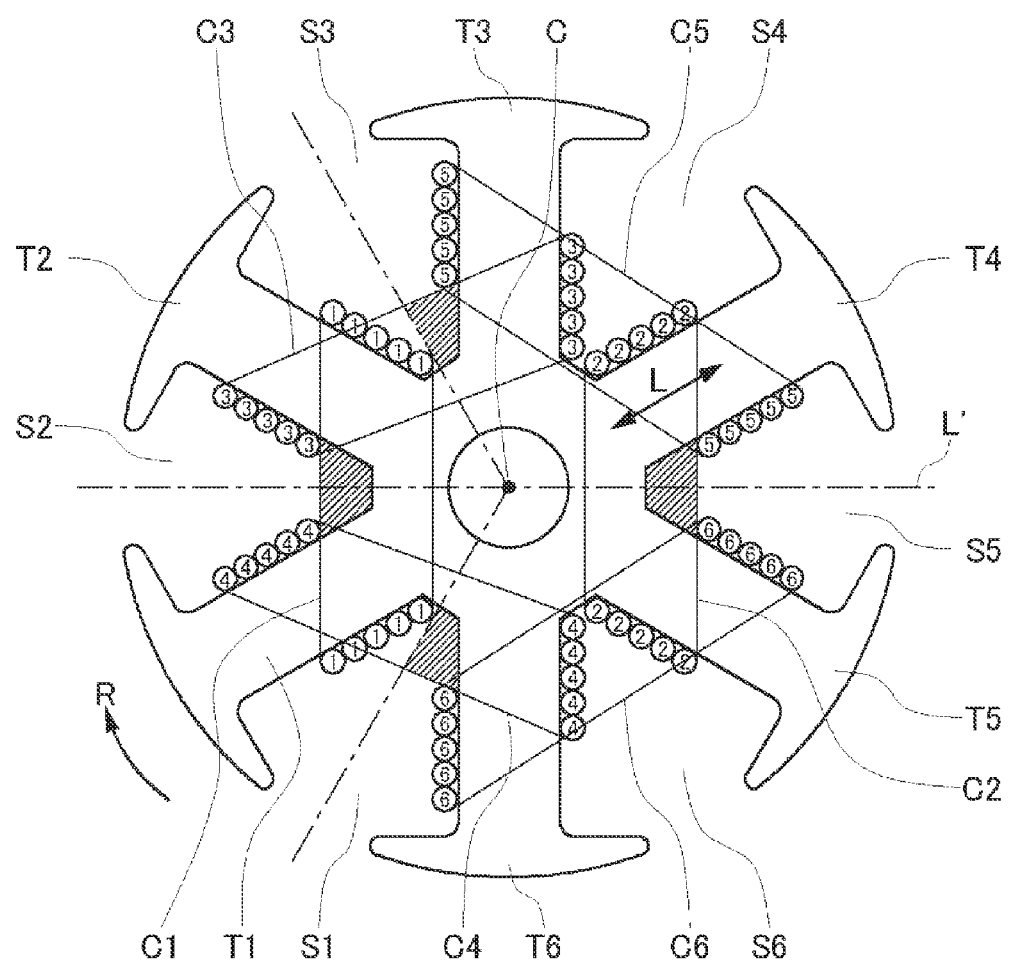
FIG. 15 is a diagram for explaining a method of winding the coils according to a modification of an embodiment.

FIG. 15 is a diagram for explaining a method of winding the coils according to a modification of the present embodiment. As shown in FIG. 15, a copper wire is first repeatedly passed through the first slit S1 and the third slit S3 in such a manner as to surround the tooth T1 and the tooth T2, so as to form a first coil C1. At this time, no coils other than the first coil C1 is wound in base parts of the tooth T1 and the tooth T2 and therefore the first coil C1 is wound in the base parts of the tooth T1 and the tooth T2 without interfering with the other coils. Also, the copper wire is repeatedly passed through the fourth slit S4 and the sixth slit S6 in such a manner as to surround the tooth T4 and the tooth T5, so as to form a second coil C2. At this time, no coils other than the second coil C2 is wound in base parts of the tooth T4 and the tooth T5 and therefore the second coil C2 is wound in the base parts of the tooth T4 and the tooth T5 without interfering with the other coils. Thus, the first coil C1 and the second coil C2 are arranged parallel to each other as viewed from the direction of the rotation axis C.

After the first coil C1 and the second coil C2 have been formed, the copper wire is next repeatedly passed through the second slit S2 and the fourth slit S4 in such a manner as to surround the tooth T2 and the tooth T3, so as to form a third coil C3. Also, the copper wire is repeatedly passed through the second slit S2 and the sixth slit S6 in such a manner as to surround the tooth T6 and the tooth T1, so as to form a fourth coil C4. Where a line passing through the centers of the first coil C1 and the second coil C2 is denoted by L', the third coil C3 and the fourth coil C4 are so arranged as to be line-symmetrical with respect to the line L'.

After the third coil C3 and the fourth coil C4 have been formed, the copper wire is next repeatedly passed through the third slit S3 and the fifth slit S5 in such a manner as to surround the tooth T3 and the tooth T4, so as to form a fifth coil C5. Also, the copper wire is repeatedly passed through the fifth slit S5 and the first slit S1 in such a manner as to surround the tooth T5 and the tooth T6, so as to form a sixth coil C6. The fifth coil C5 and the sixth coil C6 are so arranged as to be line-symmetrical with respect to the aforementioned line L'.

An armature 56 constructed by employing such a method according to the modification of the present embodiment includes a core having the six teeth, which are radially formed with the rotation axis as the center, three segments (see FIG. 5), and the six coils, where each coil is wound around each set of teeth containing two teeth. A plurality of coils (the first coil C1 to the sixth coil C6) have a pair of coils (the first coil C1 and the second coil C2) arranged parallel to each other as viewed from an axial direction. Also, a plurality of coils (the third coil C3 to the sixth coil C6) are so arranged as to be line-symmetrical with respect to the line L' passing through the pair of coils. Two coils (e.g., the first coil C1 and the second coil C2, the third coil C3 and the sixth coil C6, or the fourth coil C4 and the fifth coil C5) are connected in parallel with each other between a pair of segments. In this manner, in the armature 56, a plurality of coils are arranged line-symmetrical as a whole and therefore the stability of the armature 56 during rotation is enhanced.

Figure 16:
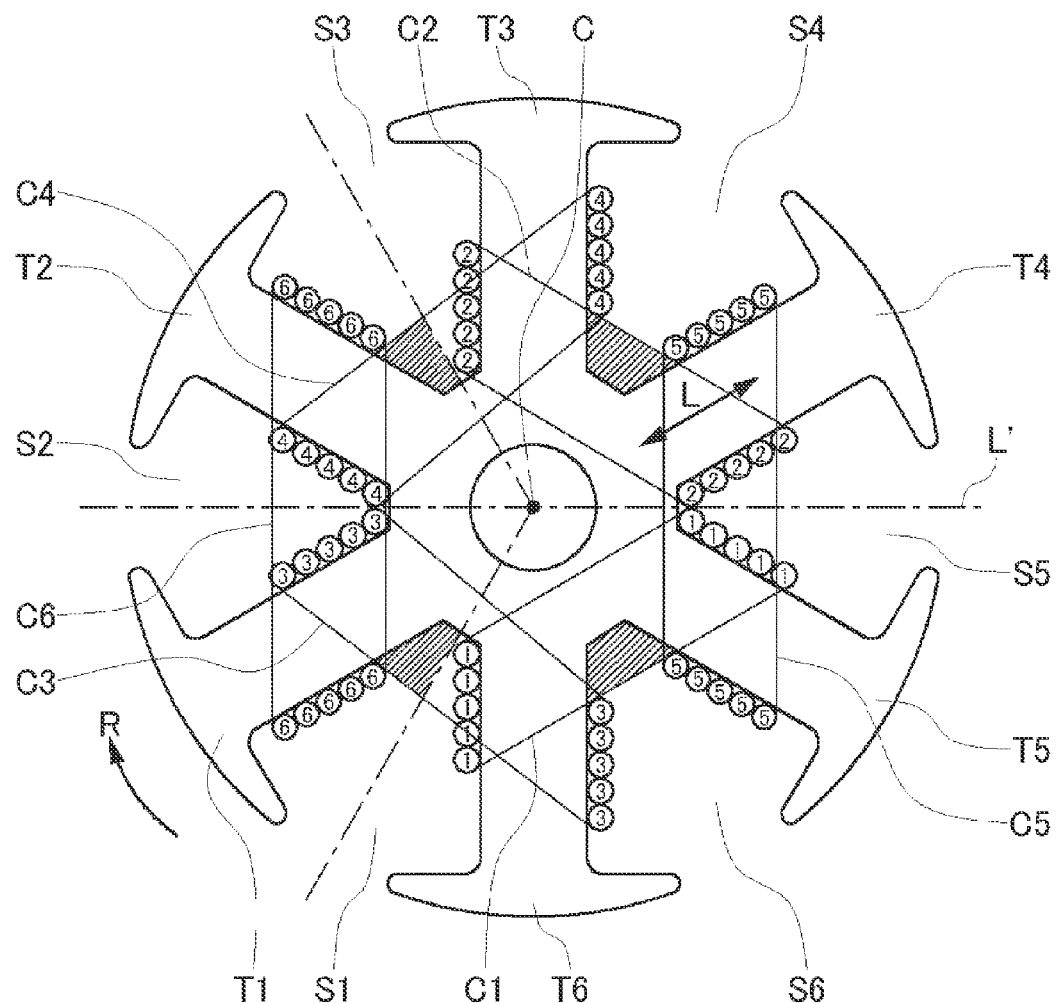
FIG. 16 is a diagram for explaining a method of winding the coils according to another modification of an embodiment.

FIG. 16 is a diagram for explaining a method of winding the coils according to another modification of the present embodiment. As shown in FIG. 16, the copper wire is first repeatedly passed through the fifth slit S5 and the first slit S1 in such a manner as to surround the tooth T5 and the tooth T6, so as to form a first coil C1. At this time, no coils other than the first coil C1 is wound in base parts of the tooth T5 and the tooth T6 and therefore the first coil C1 is wound in the base parts of the tooth T5 and the tooth T6 without interfering with the other coils. Also, the copper wire is repeatedly passed through the third slit S3 and the fifth slit S5 in such a manner as to surround the tooth T3 and the tooth T4, so as to form a second coil C2. At this time, no coils other than the second coil C2 is wound in base parts of the tooth T3 and the tooth T4 and therefore the second coil C2 is wound in the base parts of the tooth T3 and the tooth T4 without interfering with the other coils.

After the first coil C1 and the second coil C2 have been formed, the copper wire is next repeatedly passed through the second slit S2 and the sixth slit S6 in such a manner as to surround the tooth T6 and the tooth T1, so as to form a third coil C3. Also, the copper wire is repeatedly passed through the second slit S2 and the fourth slit S4 in such a manner as to surround the tooth T2 and the tooth T3, so as to form a fourth coil C4.

After the third coil C3 and the fourth coil C4 have been formed, the copper wire is next repeatedly passed through the fourth slit S4 and the sixth slit S6 in such a manner as to surround the tooth T4 and the tooth T5, so as to form a fifth coil C5. Also, the copper wire is repeatedly passed through the first slit S1 and the third slit S3 in such a manner as to surround the tooth T1 and the tooth T2, so as to form a sixth coil C6.

In an armature 58 constructed by employing such a method according to the other modification, the fifth coil C5 and the sixth coil C6 are arranged parallel to each other as viewed from the direction of the rotation axis C. Also, the first coil C1 and the second coil C2 are so arranged as to be line-symmetrical with respect to the line L'. The third coil C3 and the fourth coil C4 are so arranged as to be line-symmetrical with respect to the line L'.

As described above, the armature 58 constructed includes a core having the six teeth, which are radially formed with the rotation axis as the center, three segments (see FIG. 5), and the six coils, where each coil is wound around each set of teeth containing two teeth. A plurality of coils (the first coil C1 to the sixth coil C6) have a pair of coils (the fifth coil C5 and the sixth coil C6) arranged parallel to each other as viewed from the axial direction. Also, a plurality of coils (the first coil C1 to the fourth coil C4) are so arranged as to be line-symmetrical with respect to the line L' passing through the pair of coils. Also, two coils (e.g., the first coil C1 and the fourth coil C4, the second coil C2 and the third coil C3, or the fifth coil C5 and the sixth coil C6) are connected in parallel with each other between a pair of segments. In this manner, in the armature 58, a plurality of coils are arranged line-symmetrical as a whole and therefore the stability of the armature 58 during rotation is enhanced.

Also, in the armature 56 and the armature 58, the two coils connected in parallel between a pair of segments are arranged counter to each other with a line, which is perpendicular to the rotation axis C, located between the two coils. More preferably, as with the armature 24 shown in FIG. 5 and FIG. 8, the two coils connected in parallel between a pair of segments (i.e., the first inside coil C1 and the third outside coil C3', the second inside coil C2 and the second outside coil C2', and the third inside coil C3 and the first outside coil C1') are positioned 180 degrees in opposite of each other across a line perpendicular to the rotation axis C.

The present invention has been described based on the embodiments and the exemplary embodiments. The embodiments and the exemplary embodiments are intended to be illustrative only, and it is understood by those skilled in the art that various modifications to constituting elements or an arbitrary combination of each process could be further developed and that such modifications are also within the scope of the present invention.

The invention claimed is:

1. An armature comprising:
    a core having first to sixth slits formed successively in a circumferential direction;
    a first inside coil wound between the first slit and the third slit;
    a second inside coil wound between the fifth slit and the first slit;
    a third inside coil wound between the third slit and the fifth slit;
    a first outside coil wound between the sixth slit and the second slit;
    a second outside coil wound between the second slit and the fourth slit;
    a third outside coil wound between the fourth slit and the sixth slit,
    a shaft that penetrates a center of the core; and
    a commutator that rotates with the armature, the commutator being fixed to the shaft,
    wherein the commutator is divided into three segments, along a circumferential direction, which are a first segment, a second segment and a third segment,
    wherein the second inside coil and the second outside coil are connected in parallel with each other between the first segment and the second segment,
    wherein the first inside coil and the third outside coil are connected in parallel with each other between the second segment and the third segment, wherein the third inside coil and the first outside coil are connected in parallel with each other between the third segment and the first segment, wherein the first inside coil, the second inside coil and the third inside coil are arranged on a rotation axis side of the respective slits such that the first to third inside coils form a triangle as viewed from a direction of axis line of the rotation axis, and wherein the first outside coil, the second outside coil and the third outside coil are arranged such that the first to third outside coils surround the first inside coil, the second inside coil and the third inside coil and such that the first to third outside coils form a triangle as viewed from the direction of axis line of the rotation axis.

2. An armature according to claim 1, wherein the first inside coil, the second inside coil, the third inside coil, the first outside coil, the second outside coil and the third outside coil are continuously connected in this order in a unicursal manner.

3. A direct-current (DC) motor comprising:
a cylindrical housing;
a stator having at least a pair of magnetic poles, the stator provided along an inner surface of the housing;
an armature according to claim 1, the armature placed counter to the stator; and
a pair of brushes that slides an outer peripheral surface of the commutator, wherein, while in the armature, when one of the pair of brushes is in contact with the first segment only and when the other of the pair of brushes is in contact with the second segment only, in between the first segment and the second segment, the first inside coil and the third outside coil are connected in parallel with each other, the second inside coil and the second outside coil are connected in parallel with each other, the third inside coil and the first outside coil are connected in parallel with each other, the first inside coil and the third outside coil are connected in series with each other, the first outside coil and the third outside coil are connected in series with each other, and the first inside coil, the third outside coil, the second inside coil and the second outside coil are connected in parallel with each other, and wherein, when one of the pair of brushes is in contact with the first segment only and when the other of the pair of brushes is in contact with both the second segment and the third segment, in between the first segment, the second segment and the third segment, the first outside coil, the second inside coil, the second outside coil and the third inside coil are connected in parallel with each other.

* * * * *